US008485887B2

(12) United States Patent
Saito et al.

(10) Patent No.: US 8,485,887 B2
(45) Date of Patent: Jul. 16, 2013

(54) GAMING MACHINE EXECUTING FREE GAME AND CONTROL METHOD THEREOF

(75) Inventors: Hiroki Saito, Tokyo (JP); Masafumi Uchida, Tokyo (JP)

(73) Assignee: Aruze Gaming America, Inc., Las Vegas, NV (US)

( * ) Notice: Subject to any disclaimer, the term of this patent is extended or adjusted under 35 U.S.C. 154(b) by 0 days.

(21) Appl. No.: 13/460,182

(22) Filed: Apr. 30, 2012

(65) Prior Publication Data

US 2012/0214574 A1 Aug. 23, 2012

Related U.S. Application Data

(63) Continuation of application No. 12/589,522, filed on Nov. 13, 2008, now Pat. No. 8,187,083.

(51) Int. Cl.

*A63F 9/24* (2006.01)
*A63F 13/00* (2006.01)
*G06F 17/00* (2006.01)
*G06F 19/00* (2006.01)

(52) U.S. Cl.

USPC .................. 463/20; 463/16; 463/17; 463/18; 463/22; 273/139; 273/143; 273/269; 345/839

(58) Field of Classification Search

USPC ................. 463/16–18, 20, 22; 273/139, 143, 273/269; 345/839

See application file for complete search history.

(56) References Cited

U.S. PATENT DOCUMENTS

| | | | | |
|---|---|---|---|---|
| 6,012,983 | A | 1/2000 | Walker et al. | |
| 6,093,102 | A | 7/2000 | Bennett | |
| 6,173,955 | B1 | 1/2001 | Perrie et al. | |
| 6,960,133 | B1 * | 11/2005 | Marks et al. | 463/20 |
| 2003/0073483 | A1 * | 4/2003 | Glavich et al. | 463/20 |
| 2004/0087368 | A1 * | 5/2004 | Gauselmann | 463/42 |
| 2005/0049046 | A1 | 3/2005 | Kobayashi | |
| 2006/0172792 | A1 * | 8/2006 | Vancura | 463/16 |
| 2007/0191089 | A1 | 8/2007 | Yoshizawa | |

FOREIGN PATENT DOCUMENTS

AU 200119729 9/2001

* cited by examiner

*Primary Examiner* — Omkar Deodhar
*Assistant Examiner* — Adetokunbo O Torimiro
(74) *Attorney, Agent, or Firm* — Edwards Wildman Palmer LLP

(57) ABSTRACT

According to a gaming machine of the present invention, a specific number of free games are generated when three or more trigger symbols have been stop-displayed in a normal game. Further, when one or two trigger symbols have been stop-displayed in a free game, numeric values in number equivalent to the number of stop-displayed trigger symbols are selected, and then the number of times obtained by summing up the selected numeric values is added to the number of free games.

2 Claims, 23 Drawing Sheets

FIG. 5

Symbol table for normal game

| | 1st video reel | 2nd video reel | 3rd video reel | 4th video reel | 5th video reel |
|---|---|---|---|---|---|
| Code number | Symbol | Symbol | Symbol | Symbol | Symbol |
| 00 | K | A | CLUB | DEER | WILD |
| 01 | KNIFE | AXE | A | K | A |
| 02 | DEER | J | DEER | A | K |
| 03 | FEATURE | FEATURE | FEATURE | FEATURE | FEATURE |
| 04 | J | RHINOCEROS | K | AXE | KNIFE |
| 05 | KNIFE | A | A | Q | Q |
| 06 | Q | AXE | DEER | CLUB | RHINOCEROS |
| 07 | WILD | J | J | RHINOCEROS | AXE |
| 08 | AXE | A | KNIFE | J | J |
| 09 | CLUB | RHINOCEROS | K | Q | DEER |
| 10 | Q | Q | CLUB | KNIFE | JACKPOT 7 |
| 11 | K | BISON | A | A | K |
| 12 | DEER | JACKPOT 7 | DEER | K | CLUB |
| 13 | A | CLUB | Q | AXE | KNIFE |
| 14 | BISON | KNIFE | A | Q | Q |
| 15 | Q | AXE | AXE | CLUB | J |
| 16 | RHINOCEROS | A | RHINOCEROS | DEER | BISON |
| 17 | J | RHINOCEROS | WILD | WILD | K |
| 18 | AXE | WILD | J | WILD | CLUB |
| 19 | JACKPOT 7 | DEER | BISON | J | KNIFE |
| 20 | A | KNIFE | JACKPOT 7 | JACKPOT 7 | A |
| 21 | Q | K | Q | BISON | WILD |

FIG. 8

| Symbol | | | |
|---|---|---|---|
| | 3 symbols | 4 symbols | 5 symbols |
| J | 5 | 10 | 50 |
| Q | 5 | 10 | 50 |
| K | 5 | 10 | 50 |
| A | 5 | 10 | 50 |
| KNIFE | 10 | 25 | 100 |
| AXE | 10 | 25 | 100 |
| CLUB | 10 | 25 | 100 |
| DEER | 15 | 30 | 150 |
| RHINOCEROS | 15 | 50 | 200 |
| BISON | 20 | 75 | 250 |
| JACKPOT 7 | Jackpot | | |
| SABER TIGER (WILD) | 25 | 100 | 500 |
| WHITE TIGER (FEATURE) | Free game (※) | | |

※ Free game is conducted when three or more symbols have been rearranged

FIG. 20

Symbol table for free game

| | 1st video reel | 2nd video reel | 3rd video reel | 4th video reel | 5th video reel |
|---|---|---|---|---|---|
| Code number | Symbol | Symbol | Symbol | Symbol | Symbol |
| 00 | K | A | CLUB | DEER | WILD |
| 01 | KNIFE | AXE | A | K | A |
| 02 | DEER | J | DEER | A | K |
| 03 | FEATURE | FEATURE | FEATURE | FEATURE | FEATURE |
| 04 | J | WILD | WILD | AXE | WILD |
| 05 | KNIFE | WILD | WILD | Q | WILD |
| 06 | Q | WILD | WILD | CLUB | RHINOCEROS |
| 07 | WILD | J | J | RHINOCEROS | AXE |
| 08 | AXE | A | KNIFE | J | J |
| 09 | CLUB | RHINOCEROS | K | Q | DEER |
| 10 | Q | Q | CLUB | KNIFE | JACKPOT 7 |
| 11 | K | BISON | A | A | K |
| 12 | DEER | JACKPOT 7 | DEER | K | CLUB |
| 13 | A | CLUB | Q | AXE | KNIFE |
| 14 | BISON | KNIFE | A | Q | Q |
| 15 | Q | AXE | AXE | CLUB | J |
| 16 | RHINOCEROS | A | RHINOCEROS | DEER | BISON |
| 17 | J | RHINOCEROS | WILD | WILD | K |
| 18 | AXE | WILD | J | WILD | CLUB |
| 19 | JACKPOT 7 | DEER | BISON | J | KNIFE |
| 20 | A | KNIFE | JACKPOT 7 | JACKPOT 7 | A |
| 21 | Q | K | Q | BISON | WILD |

FIG. 21

| Number-of-additional-free-games selection table | |
|---|---|
| Number of additional free games | Random value |
| 1 | 0～32767 |
| 2 | 32768～52429 |
| 3 | 52430～62259 |
| 10 | 62259～65535 |

GAMING MACHINE EXECUTING FREE GAME AND CONTROL METHOD THEREOF

CROSS REFERENCE TO RELATED APPLICATIONS

This application is a continuation of U.S. patent application Ser. No. 12/589,522, filed Nov. 13, 2008.

BACKGROUND OF THE INVENTION

1. Field of the Invention

The present invention relates to a gaming machine executing a free game and a control method thereof.

2. Discussion of the Background

Conventionally, gaming machines called slot machines are known in which a plurality of types of symbols are scroll-displayed and then stop-displayed, and in which a predetermined amount of game media (e.g. a predetermined number of coins, or a predetermined amount of money) are offered based on a combination of stop-displayed symbols. Such slot machines are disclosed for example in U.S. Pat. Nos. 6,960,133, 6,012,983, 6,093,102, and the like.

Among those slot machines, a slot machine exists which executes a free game when a predetermined condition (e.g. a specific symbol being rearranged in a slot machine game) has been established in the games. The free game is a game to be conducted even without a game medium betted. For example, Australian Patent Publication No. 1972901 discloses a slot machine which conducts a free game as a secondary game when a predetermined condition (symbols being arranged in a specific alignment) has been established in a basic game.

Since the player can play the game without using a game medium in the free game, the player generally plays the game with a strong expectation for generation of the free game. Also, the number of times of playing the free game is a matter of serious concern for the player.

Thus, the inventor of the present invention has thought that adding new features with regard to the number of times of playing the free game can raise the player's interest and concern in the game.

The present invention was made in view of the aforementioned issues, and an object thereof is to provide a gaming machine capable of raising a player's interest and concern in a game, and a control method thereof.

SUMMARY OF THE INVENTION

The present invention provides a gaming machine having the following configuration.

That is, the gaming machine comprises a symbol display device capable of variably displaying a plurality of symbols, and a controller. The controller is programmed so as to execute the processing of: (A) executing a normal game in which the plurality of symbols are variably displayed and then stop-displayed to the symbol display device after a game medium has been betted, and in which game media in an amount corresponding to a stop-displayed symbol or a combination of stop-displayed symbols are paid out; (B) executing a free game for a specific number of times when N (N is a natural number not less than 2) or more predetermined symbols have been stop-displayed in the normal game executed in the processing (A), the free game being a game in which the plurality of symbols are variably displayed and then stop-displayed to the symbol display device even without a game medium betted, and in which game media in an amount corresponding to a stop-displayed symbol or a combination of stop-displayed symbols are paid out; (C) selecting a numeric value in number equivalent to the number of stop-displayed predetermined symbols, when 1 or more and (N−1) or less of the predetermined symbols are stop-displayed in the free game before completion of execution of the processing (B); and (D) executing the free game for the number of times which is obtained by summing up the numeric value selected in the processing (C), after execution of the processing (B).

According to the gaming machine, the specific number of free games are generated when N or more of the predetermined symbols have been stop-displayed in the normal game. Further, when 1 or more and (N−1) or less of the predetermined symbols have been stop-displayed in the free game, numeric values in number equivalent to the number of stop-displayed predetermined symbols are selected, and then the number of free games in number equivalent to the number of times obtained by summing up the selected numeric values is added.

As just described, N or more of the predetermined symbols are required to be stop-displayed in order for the free game to be generated; however, once the free game has been generated, the number of free games is added even when the number of stop-displayed predetermined symbols is less than N. Thus, once the free game is generated, it is possible to give the player an impression that the free game can be played for long periods of time, and to increase a sense of expectation of the player for generation of the free game.

Also, according to the gaming machine, a large numeric value being selected can lead to addition of a large number of free games. It is therefore possible to increase a sense of expectation of the player for the addition of the number of free games. Particularly, it is possible to make the player have a sense of expectation for stop-display of (N−1) of the predetermined symbols and for selection of (N−1) of the large numeric values. Hence, it is possible to make the player absorbed in the game.

The present invention further provides a gaming machine having the following configuration.

That is, the gaming machine comprises: a symbol display device capable of variably displaying a plurality of symbols; a display capable of displaying an image; a memory capable of storing data about a game; and a controller. The controller is programmed so as to execute the processing of: (A) executing a normal game in which the plurality of symbols are variably displayed and then stop-displayed to the symbol display device after a game medium has been betted, and in which game media in an amount corresponding to a stop-displayed symbol or a combination of stop-displayed symbols are paid out; (B) executing a free game for a specific number of times when N (N is a natural number) or more predetermined symbols have been stop-displayed in the normal game executed in the processing (A), the free game being a game in which the plurality of symbols are variably displayed and then stop-displayed to the symbol display device even without a game medium betted, and in which game media in an amount corresponding to a stop-displayed symbol or a combination of stop-displayed symbols are paid out; (C) storing, into the memory, number-of-retrigger-establishments data showing the number of times of the free game in which N or more of the predetermined symbols have been stop-displayed before completion of execution of the processing (B); (D) displaying to the display a numeral image corresponding to the number of times shown by the number-of-retrigger-establishments data stored in the memory; and (E) executing the free game for the number of times which is obtained by multiplying the number of times shown by the number-of-retrigger-establishments data stored in the memory by the specific number of times, after execution of the processing (B).

According to the gaming machine, the specific number of free games are generated when N or more of the predetermined symbols have been stop-displayed in the normal game. After the specific number of free games have been played, free games in number equivalent to the number of times obtained by multiplying the number of retrigger establishments by the specific number of times are further conducted. The number of retrigger establishments is the number of times that N or more of the predetermined symbols have been stop-displayed after the generation of the free game.

As just described, the free game is generated when N or more of the predetermined symbols have been stop-displayed in the normal game, while the number of free games is added when N or more of the predetermined symbols have been stop-displayed in the free game; it is therefore possible to maintain the sense of expectation of the player for stop-display of N or more of the predetermined symbols, even in the free game.

Further, according to the gaming machine, the numeric image corresponding to the number of retrigger establishments is displayed. Displaying the numeric image can make the player recognize at a glance the number of retrigger establishments, and the number of free games to be continued after the end of the specific number of free games. Also, it is possible to make the player recognize promptly the number of generated free games in total. Furthermore, showing the increase of the numeric value corresponding to the numeric image can give the player an impression that the player is amassing money. As a result, it is possible to provide a sense of satisfaction to the player seeing the increase of the numeric value that corresponds to the numeric image.

The present invention further provides a gaming machine having the following configuration.

That is, the gaming machine comprises: a symbol display device capable of variably displaying a plurality of symbols; a memory capable of storing data about a game; and a controller. The controller is programmed so as to execute the processing of: (A) executing a normal game in which the plurality of symbols are variably displayed and then stop-displayed to the symbol display device after a game medium has been betted, and in which game media in an amount corresponding to a stop-displayed symbol or a combination of stop-displayed symbols are paid out; (B) starting a free game and also storing data showing a specific number of times as number-of-remaining-times data showing the number of remaining times for the free game into the memory, when N (N is a natural number not less than 2) or more predetermined symbols have been stop-displayed in the normal game executed in the processing (A), the free game being a game in which the plurality of symbols are variably displayed and then stop-displayed to the symbol display device even without a game medium betted, and in which game media in an amount corresponding to a stop-displayed symbol or a combination of stop-displayed symbols are paid out; (C) subtracting 1 from the number of times shown by the number-of-remaining-times data stored in the memory, every time the free game is executed; (D) adding the number of times, which is obtained by selecting a numeric value in number equivalent to the number of stop-displayed predetermined symbols and then summing up the selected numeric value, to the number of times shown by the number-of-remaining-times data stored in the memory, when 1 or more and (N−1) or less of the predetermined symbols have been stop-displayed in the free game; (E) adding 1 to the number of times shown by number-of-stocks data stored in the memory, when N or more of the predetermined symbols have been stop-displayed in the free game; and (F) ending the free game in the case where the number of times shown by the number-of-stocks data stored in the memory is 0, while subtracting 1 from the number of times shown by the number-of-stocks data and then storing data showing the specific number of times as the number-of-remaining-times data into the memory in the case where the number of times shown by the number-of-stocks data stored in the memory is not 0, when the number of times shown by the number-of-remaining-times data stored in the memory has become 0.

According to the gaming machine, the specific number of free games are generated when N or more of the predetermined symbols have been stop-displayed in the normal game. Further, when 1 or more and (N−1) or less of the predetermined symbols have been stop-displayed in the free game, numeric values in number equivalent to the number of stop-displayed predetermined symbols are selected, and then the number of free games in number equivalent to the number of times obtained by summing up the selected numeric values is added.

As just described, N or more of the predetermined symbols are required to be stop-displayed in order for the free game to be generated; however, once the free game has been generated, the number of free games is added even when the number of stop-displayed predetermined symbols is less than N. Thus, once the free game is generated, it is possible to give the player an impression that the free game can be played for long periods of time, and to increase a sense of expectation of the player for generation of the free game.

Also, according to the gaming machine, a large numeric value being selected can lead to addition of a large number of free games. It is therefore possible to increase a sense of expectation of the player for the addition of the number of free games. Particularly, it is possible to make the player have a sense of expectation for stop-display of (N−1) of the predetermined symbols and for selection of (N−1) of the large numeric values. Hence, it is possible to make the player absorbed in the game.

Further, according to the gaming machine, the free game is generated when N or more of the predetermined symbols have been stop-displayed in the normal game, while the number of free games is added when N or more of the predetermined symbols have been stop-displayed in the free game; it is therefore possible to maintain the sense of expectation of the player for stop-display of N or more of the predetermined symbols, even in the free game.

Further, according to the gaming machine, when a large numeric value has been selected, there is a possibility that a larger number of free games is added in the case where 1 or more and (N−1) or less of the predetermined symbols have been stop-displayed than in the case where the predetermined symbols in number not less than N have been stop-displayed.

Thus, since the game does not simply make the player have a sense of expectation for stop-display of a large number of predetermined symbols, the game does not tend to be monotone and it is possible to provide the game that hardly bores the player.

Also, when a situation is actually generated where the number of free games, to be added due to the stop-display of 1 or more and (N−1) or less of the predetermined symbols, is larger than the specific number of times, it is possible to make the player find the game surprising. Additionally, it is possible to please the player. As a result, it becomes possible to make the player absorbed in the game.

The present invention further provides a gaming machine having the following configuration.

That is, the gaming machine comprises: a symbol display device capable of variably displaying a plurality of symbols; a memory capable of storing data about a game; and a controller. The controller is programmed so as to execute the processing of: (A) executing a normal game in which the plurality of symbols are variably displayed and then stop-displayed to the symbol display device after a game medium has been betted, and in which game media in an amount corresponding to a stop-displayed symbol or a combination of stop-displayed symbols are paid out; (B) starting a free game and also storing data showing a specific number of times as number-of-remaining-times data showing the number of remaining times for the free game into the memory, when N (N is a natural number) or more predetermined symbols have been stop-displayed in the normal game executed in the processing (A), the free game being a game in which the plurality of symbols are variably displayed and then stop-displayed to the symbol display device even without a game medium betted, and in which game media in an amount corresponding to a stop-displayed symbol or a combination of stop-displayed symbols are paid out; (C) subtracting 1 from the number of times shown by the number-of-remaining-times data stored in the memory, every time the free game is executed; (D) adding 1 to the number of times shown by number-of-stocks data, on condition that the number of times shown by the number-of-stocks data stored in the memory is equal to or less than a predetermined number of times, when N or more of the predetermined symbols have been stop-displayed in the free game; and (E) ending the free game in the case where the number of times shown by the number-of-stocks data stored in the memory is 0, while subtracting 1 from the number of times shown by the number-of-stocks data and then storing data showing the specific number of times as the number-of-remaining-times data into the memory in the case where the number of times shown by the number-of-stocks data stored in the memory is not 0, when the number of times shown by the number-of-remaining-times data stored in the memory has become 0.

According to the gaming machine, the free game is generated when N or more of the predetermined symbols have been stop-displayed in the normal game, while the number of free games is added when N or more of the predetermined symbols have been stop-displayed in the free game; it is therefore possible to maintain the sense of expectation of the player for stop-display of N or more of the predetermined symbols, even in the free game.

According to the gaming machine, when N or more of the predetermined symbols have been stop-displayed in the free game, 1 is added to the number of times (the number of stocks) shown by the number-of-stocks data on condition that the number of stocks is equal to or less than the predetermined number of times. As just described, providing an upper limit to the number of stocks can prevent an infinite increase in the number of stocks. As a result, a profit decrease for the game facility can be prevented.

Further, although there is a possibility that an existence of a player continuously playing the free game for a too long period of time causes the other players to feel a sense of unfairness, the aforementioned gaming machine can prevent a rise of such a sense of unfairness.

The present invention further provides a control method of a gaming machine having the following configuration.

That is, the control method of a gaming machine comprises the steps of: (A) executing a normal game in which a plurality of symbols are variably displayed and then stop-displayed to a symbol display device after a game medium has been betted, and in which game media in an amount corresponding to a stop-displayed symbol or a combination of stop-displayed symbols are paid out; (B) executing a free game for a specific number of times when N (N is a natural number not less than 2) or more predetermined symbols have been stop-displayed in the normal game executed in the step (A), the free game being a game in which the plurality of symbols are variably displayed and then stop-displayed to the symbol display device even without a game medium betted, and in which game media in an amount corresponding to a stop-displayed symbol or a combination of stop-displayed symbols are paid out; (C) selecting a numeric value in number equivalent to the number of stop-displayed predetermined symbols, when 1 or more and (N−1) or less of the predetermined symbols are stop-displayed in the free game before completion of execution of the step (B); and (D) executing the free game for the number of times which is obtained by summing up the numeric value selected in the step (C), after execution of the step (B).

According to the control method of a gaming machine, the specific number of free games are generated when N or more of the predetermined symbols have been stop-displayed in the normal game. Further, when 1 or more and (N−1) or less of the predetermined symbols have been stop-displayed in the free game, numeric values in number equivalent to the number of stop-displayed predetermined symbols are selected, and then the number of free games in number equivalent to the number of times obtained by summing up the selected numeric values is added.

As just described, N or more of the predetermined symbols are required to be stop-displayed in order for the free game to be generated; however, once the free game has been generated, the number of free games is added even when the number of stop-displayed predetermined symbols is less than N. Thus, once the free game is generated, it is possible to give the player an impression that the free game can be played for long periods of time, and to increase a sense of expectation of the player for generation of the free game.

Also, according to the control method of a gaming machine, a large numeric value being selected can lead to addition of a large number of free games. It is therefore possible to increase a sense of expectation of the player for the addition of the number of free games. Particularly, it is possible to make the player have a sense of expectation for stop-display of (N−1) of the predetermined symbols and for selection of (N−1) of the large numeric values. Hence, it is possible to make the player absorbed in the game.

The present invention further provides a control method of a gaming machine having the following configuration.

That is, the control method of a gaming machine comprises the steps of: (A) executing a normal game in which a plurality of symbols are variably displayed and then stop-displayed to a symbol display device after a game medium has been betted, and in which game media in an amount corresponding to a stop-displayed symbol or a combination of stop-displayed symbols are paid out; (B) executing a free game for a specific number of times when N (N is a natural number) or more predetermined symbols have been stop-displayed in the normal game executed in the step (A), the free game being a game in which the plurality of symbols are variably displayed and then stop-displayed to the symbol display device even without a game medium betted, and in which game media in an amount corresponding to a stop-displayed symbol or a combination of stop-displayed symbols are paid out; (C) storing, into a memory, number-of-retrigger-establishments data showing the number of times of the free game in which N or more of the predetermined symbols have been stop-displayed before completion of execution of the step (B); (D) displaying to a display a numeral image corresponding to the number of times shown by the number-of-retrigger-establishments data stored in the memory; and (E) executing the free game for the number of times which is obtained by multiplying the number of times shown by the number-of-retrigger-establishments data stored in the memory by the specific number of times, after execution of the step (B).

According to the control method of a gaming machine, the specific number of free games are generated when N or more of the predetermined symbols have been stop-displayed in the normal game. After the specific number of free games have been played, free games in number equivalent to the number of times obtained by multiplying the number of retrigger establishments by the specific number of times are further conducted. The number of retrigger establishments is the number of times that N or more of the predetermined symbols have been stop-displayed after the generation of the free game.

As just described, the free game is generated when N or more of the predetermined symbols have been stop-displayed in the normal game, while the number of free games is added when N or more of the predetermined symbols have been stop-displayed in the free game; it is therefore possible to maintain the sense of expectation of the player for stop-display of N or more of the predetermined symbols, even in the free game.

Further, according to the control method of a gaming machine, the numeric image corresponding to the number of retrigger establishments is displayed. Displaying the numeric image can make the player recognize at a glance the number of retrigger establishments, and the number of free games to be continued after the end of the specific number of free games. Also, it is possible to make the player recognize promptly the number of generated free games in total. Furthermore, showing the increase of the numeric value corresponding to the numeric image can give the player an impression that the player is amassing money. As a result, it is possible to provide a sense of satisfaction to the player seeing the increase of the numeric value that corresponds to the numeric image.

The present invention further provides a control method of a gaming machine having the following configuration.

That is, the control method of a gaming machine comprises the steps of: (A) executing a normal game in which a plurality of symbols are variably displayed and then stop-displayed to a symbol display device after a game medium has been betted, and in which game media in an amount corresponding to a stop-displayed symbol or a combination of stop-displayed symbols are paid out; (B) starting a free game and also storing data showing a specific number of times as number-of-remaining-times data showing the number of remaining times for the free game into a memory, when N (N is a natural number not less than 2) or more predetermined symbols have been stop-displayed in the normal game executed in the step (A), the free game being a game in which the plurality of symbols are variably displayed and then stop-displayed to the symbol display device even without a game medium betted, and in which game media in an amount corresponding to a stop-displayed symbol or a combination of stop-displayed symbols are paid out; (C) subtracting 1 from the number of times shown by the number-of-remaining-times data stored in the memory, every time the free game is executed; (D) adding the number of times, which is obtained by selecting a numeric value in number equivalent to the number of stop-displayed predetermined symbols and then summing up the selected numeric value, to the number of times shown by the number-of-remaining-times data stored in the memory, when 1 or more and (N−1) or less of the predetermined symbols have been stop-displayed in the free game; (E) adding 1 to the number of times shown by number-of-stocks data stored in the memory, when N or more of the predetermined symbols have been stop-displayed in the free game; and (F) ending the free game in the case where the number of times shown by the number-of-stocks data stored in the memory is 0, while subtracting 1 from the number of times shown by the number-of-stocks data and then storing data showing the specific number of times as the number-of-remaining-times data into the memory in the case where the number of times shown by the number-of-stocks data stored in the memory is not 0, when the number of times shown by the number-of-remaining-times data stored in the memory has become 0.

According to the control method of a gaming machine, the specific number of free games are generated when N or more of the predetermined symbols have been stop-displayed in the normal game. Further, when 1 or more and (N−1) or less of the predetermined symbols have been stop-displayed in the free game, numeric values in number equivalent to the number of stop-displayed predetermined symbols are selected, and then the number of free games in number equivalent to the number of times obtained by summing up the selected numeric values is added.

As just described, N or more of the predetermined symbols are required to be stop-displayed in order for the free game to be generated; however, once the free game has been generated, the number of free games is added even when the number of stop-displayed predetermined symbols is less than N. Thus, once the free game is generated, it is possible to give the player an impression that the free game can be played for long periods of time, and to increase a sense of expectation of the player for generation of the free game.

Also, according to the control method of a gaming machine, a large numeric value being selected can lead to addition of a large number of free games. It is therefore possible to increase a sense of expectation of the player for the addition of the number of free games. Particularly, it is possible to make the player have a sense of expectation for stop-display of (N−1) of the predetermined symbols and for selection of (N−1) of the large numeric values. Hence, it is possible to make the player absorbed in the game.

Further, according to the control method of a gaming machine, the free game is generated when N or more of the predetermined symbols have been stop-displayed in the normal game, while the number of free games is added when N or more of the predetermined symbols have been stop-displayed in the free game; it is therefore possible to maintain the sense of expectation of the player for stop-display of N or more of the predetermined symbols, even in the free game.

Further, according to the control method of a gaming machine, when a large numeric value has been selected, there is a possibility that a larger number of free games is added in the case where 1 or more and (N−1) or less of the predetermined symbols have been stop-displayed than in the case where the predetermined symbols in number not less than N have been stop-displayed.

Thus, since the game does not simply make the player have a sense of expectation for stop-display of a large number of predetermined symbols, the game does not tend to be monotone and it is possible to provide the game that hardly bores the player.

Also, when a situation is actually generated where the number of free games, to be added due to the stop-display of 1 or more and (N−1) or less of the predetermined symbols, is larger than the specific number of times, it is possible to make the player find the game surprising. Additionally, it is possible to please the player. As a result, it becomes possible to make the player absorbed in the game.

The present invention further provides a control method of a gaming machine having the following configuration.

That is, the control method of a gaming machine comprises the steps of: (A) executing a normal game in which a plurality of symbols are variably displayed and then stop-displayed to a symbol display device after a game medium has been betted, and in which game media in an amount corresponding to a stop-displayed symbol or a combination of stop-displayed symbols are paid out; (B) starting a free game and also storing data showing the specific number of times as number-of-remaining-times data showing the number of remaining times for the free game into a memory, when N (N is a natural number) or more predetermined symbols have been stop-displayed in the normal game executed in the step (A), the free game being a game in which the plurality of symbols are variably displayed and then stop-displayed to the symbol display device even without a game medium betted, and in which game media in an amount corresponding to a stop-displayed symbol or a combination of stop-displayed symbols are paid out; (C) subtracting 1 from the number of times shown by the number-of-remaining-times data stored in the memory, every time the free game is executed; (D) adding 1 to the number of times shown by number-of-stocks data, on condition that the number of times shown by the number-of-stocks data stored in the memory is equal to or less than the a predetermined number of times, when N or more of the predetermined symbols have been stop-displayed in the free game; and (E) ending the free game in the case where the number of times shown by the number-of-stocks data stored in the memory is 0, while subtracting 1 from the number of times shown by the number-of-stocks data and then storing data showing the specific number of times as the number-of-remaining-times data into the memory in the case where the number of times shown by the number-of-stocks data stored in the memory is not 0, when the number of times shown by the number-of-remaining-times data stored in the memory has become 0.

According to the control method of a gaming machine, the free game is generated when N or more of the predetermined symbols have been stop-displayed in the normal game, while the number of free games is added when N or more of the predetermined symbols have been stop-displayed in the free game; it is therefore possible to maintain the sense of expectation of the player for stop-display of N or more of the predetermined symbols, even in the free game.

According to the control method of a gaming machine, when N or more of the predetermined symbols have been stop-displayed in the free game, 1 is added to the number of times (the number of stocks) shown by the number-of-stocks data on condition that the number of stocks is equal to or less than the predetermined number of times. As just described, providing an upper limit to the number of stocks can prevent an infinite increase in the number of stocks. As a result, a profit decrease for the game facility can be prevented.

Further, although there is a possibility that an existence of a player continuously playing the free game for a too long period of time causes the other players to feel a sense of unfairness, the aforementioned control method of a gaming machine can prevent a rise of such a sense of unfairness.

BRIEF DESCRIPTIONS OF THE DRAWINGS

FIG. 5 is a view illustrating a symbol table for normal game.

FIG. 8 is a view illustrating a number-of-payouts determination table.

FIG. 20 is a view illustrating a symbol table for free game.

FIG. 21 is a view illustrating a number-of-additional-free-games selection table.

DESCRIPTION OF THE EMBODIMENT

Figure 1A:
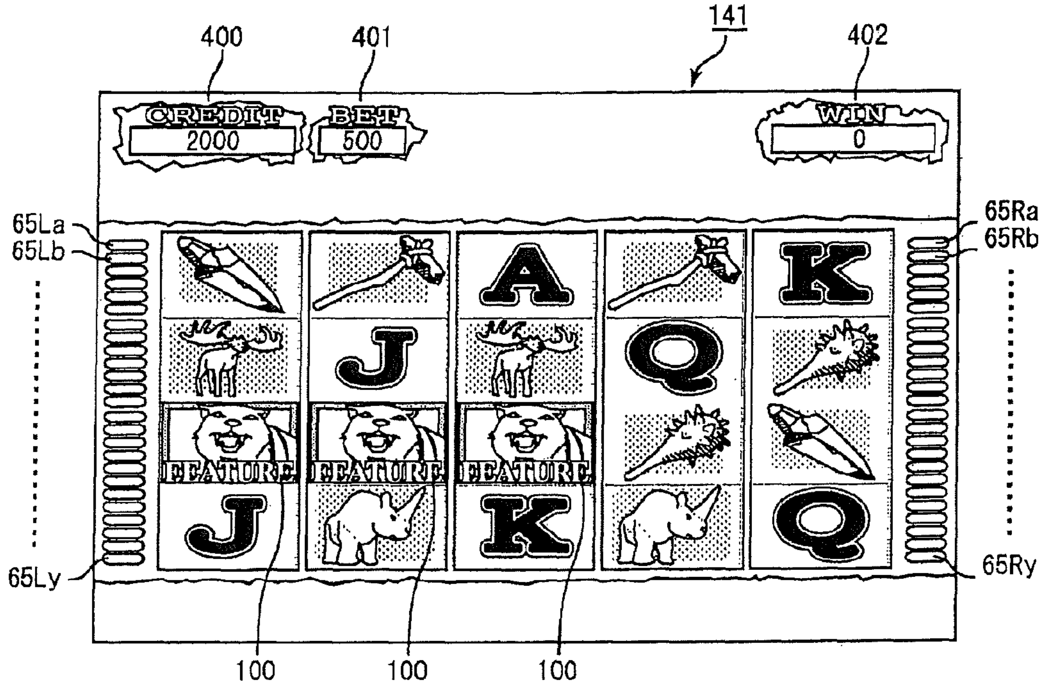
FIG. 1A is a view illustrating an exemplary image displayed to a lower image display panel provided in a gaming machine according to an embodiment of the present invention.

Hereinafter, an embodiment of the present invention is described with reference to the drawings.

A gaming machine according to one embodiment of the present invention comprises: (A) executing a normal game in which the plurality of symbols are variably displayed and then stop-displayed by video reels after a coin has been betted, and in which coins in an amount corresponding to a stop-displayed symbol or a combination of stop-displayed symbols are paid out; (B) starting a free game and also storing data showing a specific number of times as number-of-remaining-times data showing the number of remaining times for the free game into the memory, when N or more trigger symbols have been stop-displayed in the normal game; (C) subtracting 1 from the number of times shown by the number-of-remaining-times data stored in the memory, every time the free game is executed; (D) adding the number of times, which is obtained by selecting a numeric value in number equivalent to the number of stop-displayed trigger symbols and then summing up the selected numeric value, to the number of times shown by the number-of-remaining-times data stored in the memory, when 1 or more and (N−1) or less of the trigger symbols have been stop-displayed in the free game; (E) adding 1 to the number of times shown by number-of-stocks data stored in the memory, when N or more of the trigger symbols have been stop-displayed in the free game; and (F) ending the free game in the case where the number of times shown by the number-of-stocks data stored in the memory is 0, while subtracting 1 from the number of times shown by the number-of-stocks data and then storing data showing the specific number of times as the number of-remaining-times data into the memory in the case where the number of times shown by the number-of-stocks data stored in the memory is not 0, when the number of times shown by the number-of-remaining-times data stored in the memory has become 0.

First, with reference to FIG. 1 (FIGS. 1A to 1H), an overview of the present embodiment is described.

FIGS. 1A to 1H are views illustrating an exemplary image displayed to a lower image display panel provided in the gaming machine according to the embodiment of the present invention.

In a gaming machine 1 (see FIG. 3) according to the present embodiment, a plurality of symbols are scroll-displayed and then stop-displayed (hereinafter also referred to as "being rearranged") by video reels displayed to a lower image display panel 141 (see FIG. 4).

FIG. 1A shows a state in which three trigger symbols 100 are stop-displayed. A free game is generated when three or more trigger symbols 100 are stop-displayed in the present embodiment. The free game is a game to be conducted even without a game medium such as a coin being betted.

Of games to be conducted in the gaming machine 1, games other than the free game are called normal games in the present specification.

Figure 1B:
FIG. 1B is a view illustrating an exemplary image to be displayed to the lower image display panel provided in the gaming machine according to the embodiment of the present invention.
Figure 1C:
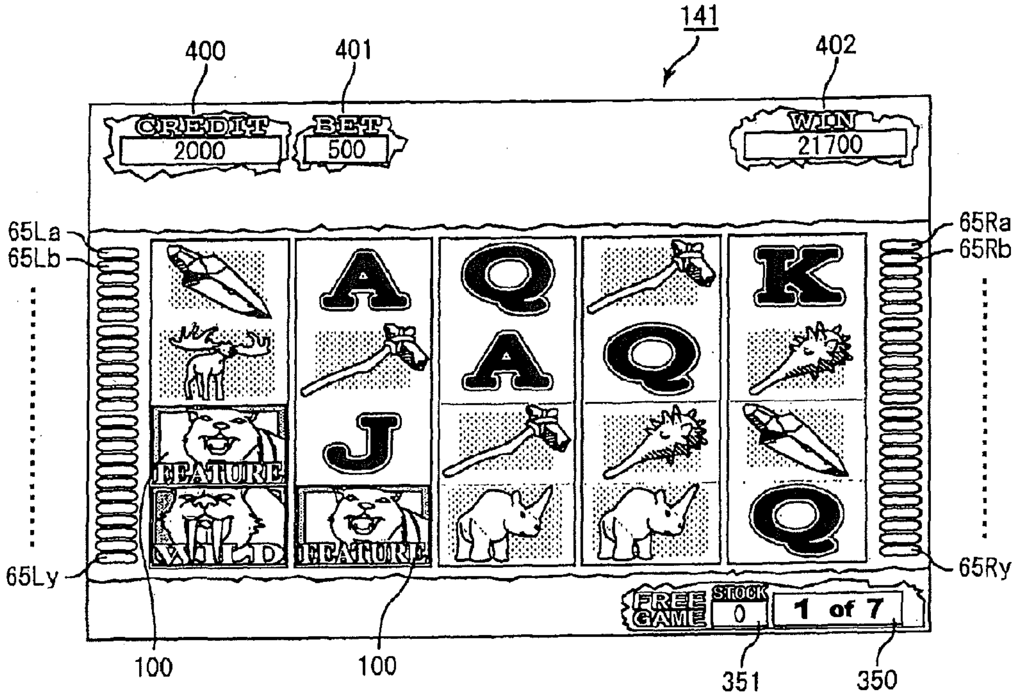
FIG. 1C is a view illustrating an exemplary image displayed to the lower image display panel provided in the gaming machine according to the embodiment of the present invention.

FIG. 1B shows a state in which a free game generation image 250 is displayed when three trigger symbols 100 have been stop-displayed. The free game generation image 250 shows the number of generated free games. As shown in FIG. 1B, in the present embodiment, the number (specific number) of free games to be generated when three or more trigger symbols 100 have been stop-displayed in the normal game is seven.

Further, FIG. 1B also shows a state in which a number-of-free-games display portion 350 and a number-of-stocks display portion 351 are provided in the lower image display panel 141.

The number-of-free-games display portion 350 displays the number of free games that have been generated (hereinafter also referred to as "the number of all free games") and the number of free games that have been already executed (hereinafter also referred to as "the number of executed free games"). The example illustrated in FIG. 1B shows a state in which the number of all free games is seven and the number of executed free games is zero.

The number-of-stocks display portion 351 displays the number of stocks. The number of stocks is described later using FIGS. 1E to 1H.

The trigger symbol 100 stop-displayed in the free game increases the number of remaining free games.

Hereinafter, two cases are described: (I) the case where the number of trigger symbols 100 stop-displayed is two or less; and (II) the case where the number of trigger symbols 100 stop-displayed is three or more.

(I) The Case where the Number of Trigger Symbols 100 Stop-Displayed is Two or Less In this case, numeric values (the number of additional free games) in number equivalent to the number of stop-displayed trigger symbols 100 are selected from "1", "2", "3" and "10", and the number of times obtained by summing up the selected numeric values is added to the number of free games.

Figure 10:
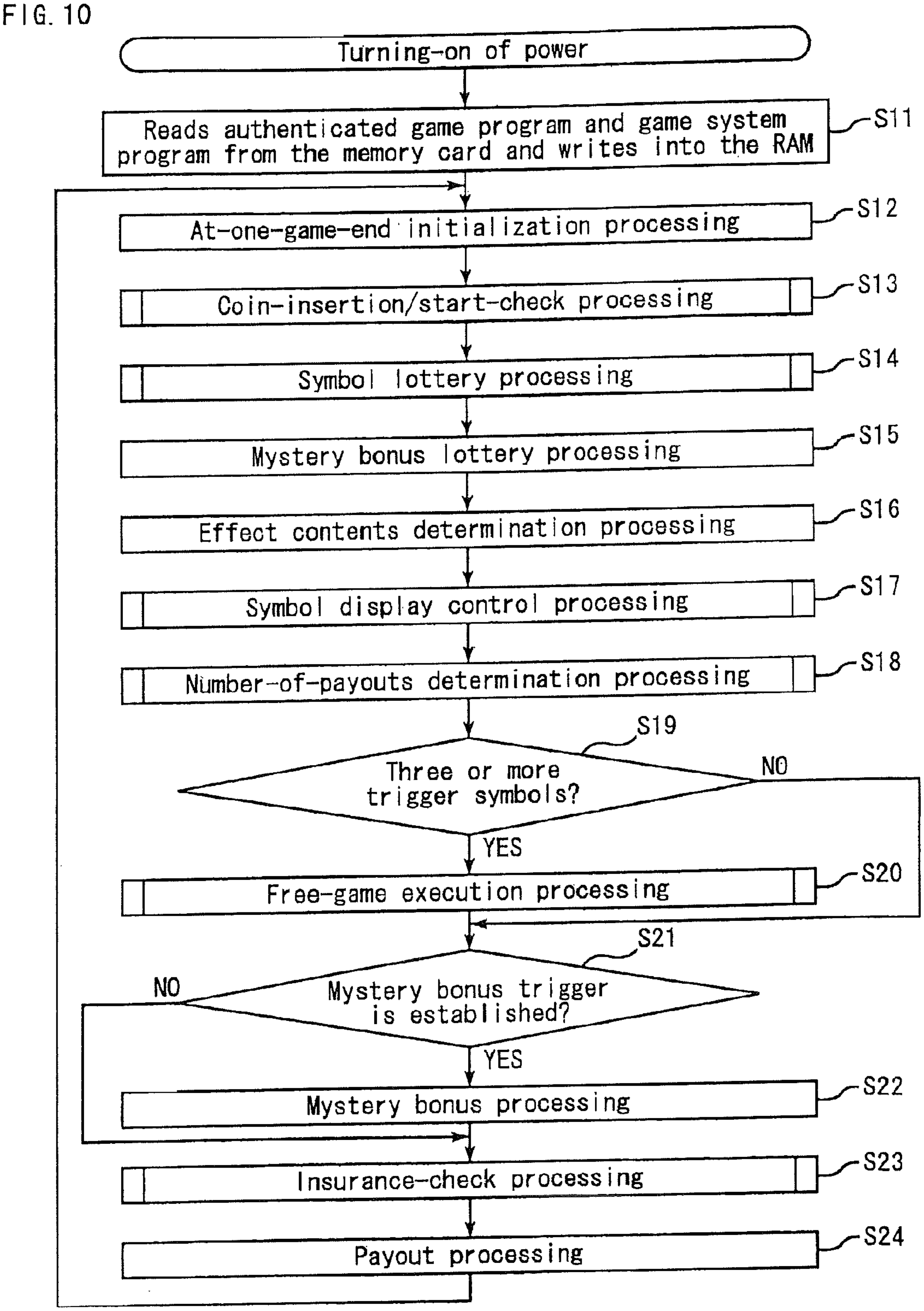
FIG. 10 is a view illustrating a flowchart of main control processing for the gaming machine according to the embodiment of the present invention.

FIG. 10 shows a state in which two trigger symbols 100 are stop-displayed.

Figure 1D:
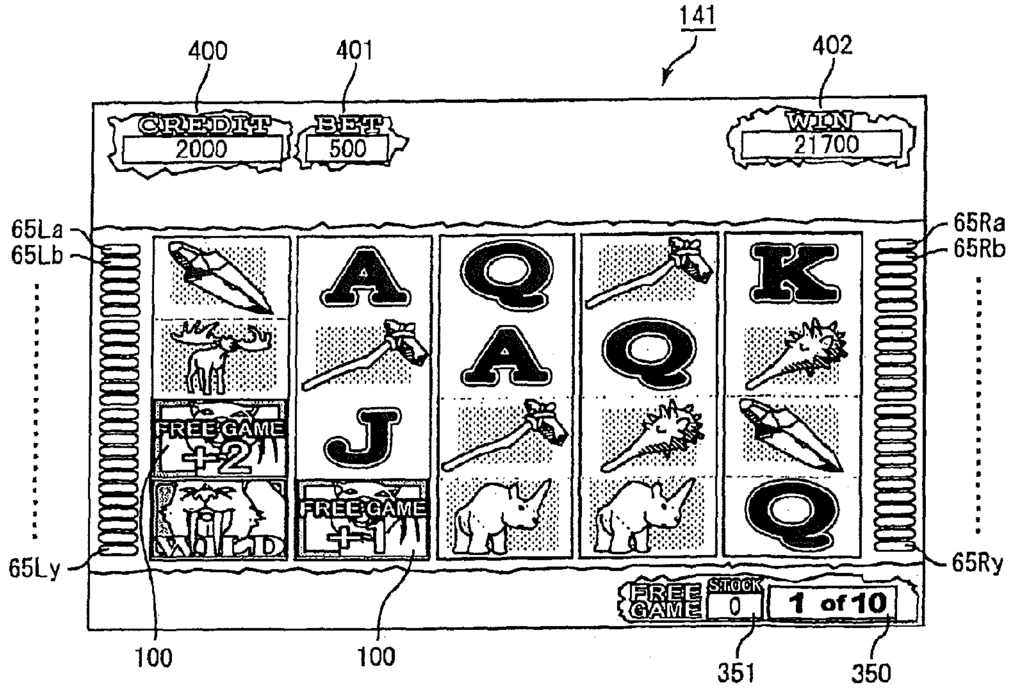
FIG. 1D is a view illustrating an exemplary image displayed to the lower image display panel provided in the gaming machine according to the embodiment of the present invention.

FIG. 1D shows a state in which letter images of "FREE GAME+1" and "FREE GAME+2" are displayed to respective places of the stop-displayed trigger symbols 100. Those letter images show that "1" and "2" have been selected as the numbers of addition free games. As a result, the number of all free games displayed to the number-of-free-games display portion 350 has increased from 7 to 10.

(II) The Case where the Number of Stop-Displayed Trigger Symbols 100 is Three or More.

In this case, 1 is added to the number of stocks.

Figure 1E:
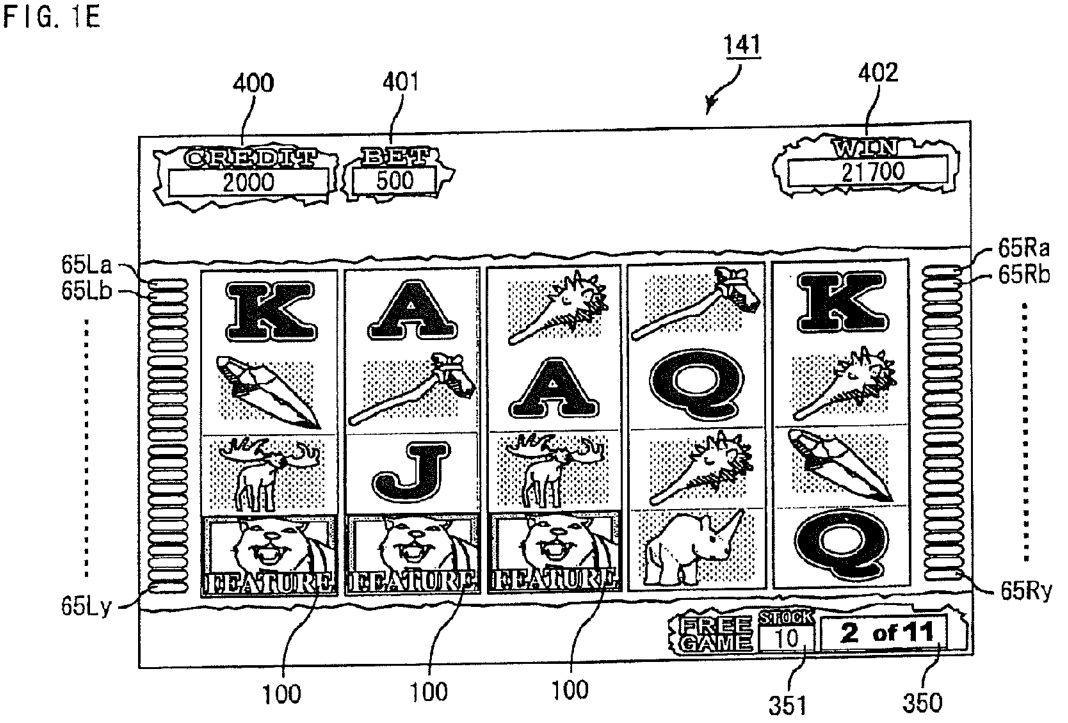
FIG. 1E is a view illustrating an exemplary image displayed to the lower image display panel provided in the gaming machine according to the embodiment of the present invention.

FIG. 1E shows a state in which three trigger symbols 100 are stop-displayed.

Figure 1F:
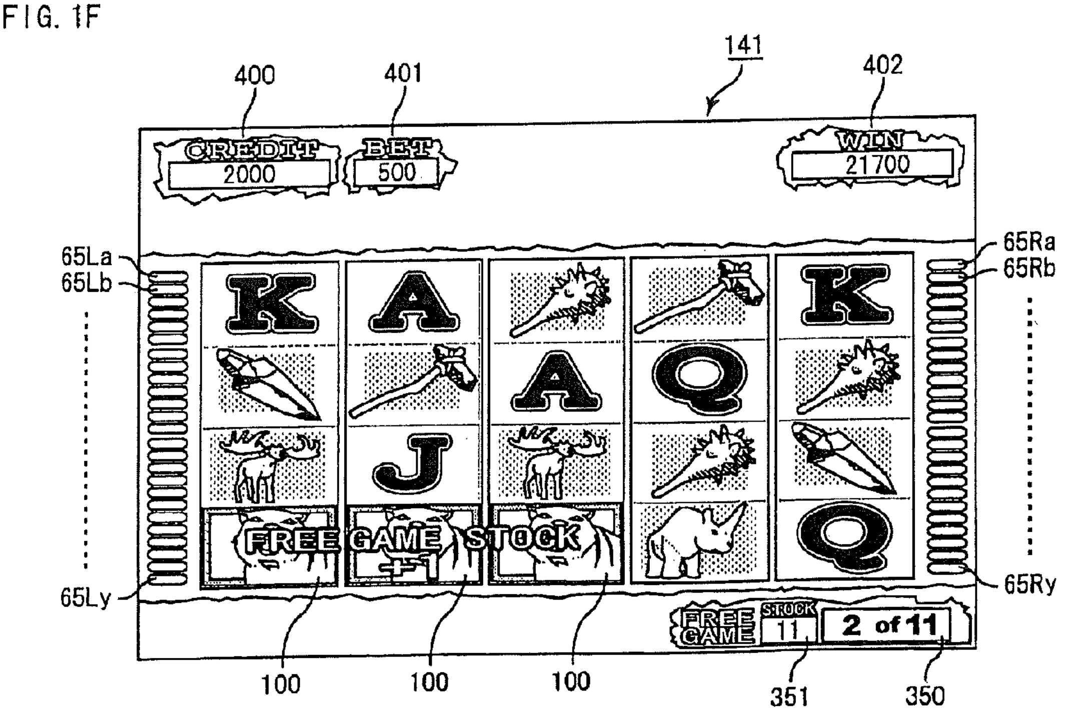
FIG. 1F is a view illustrating an exemplary image displayed to the lower image display panel provided in the gaming machine according to the embodiment of the present invention.

FIG. 1F shows a state in which a letter image of "FREE GAME STOCK+1" is displayed to the places of the stop-displayed trigger symbols 100. The letter image shows that 1 has been added to the number of stocks. As a result, the number of stocks displayed to the number-of-stocks display portion 351 has increased from 10 to 11.

Figure 1G:
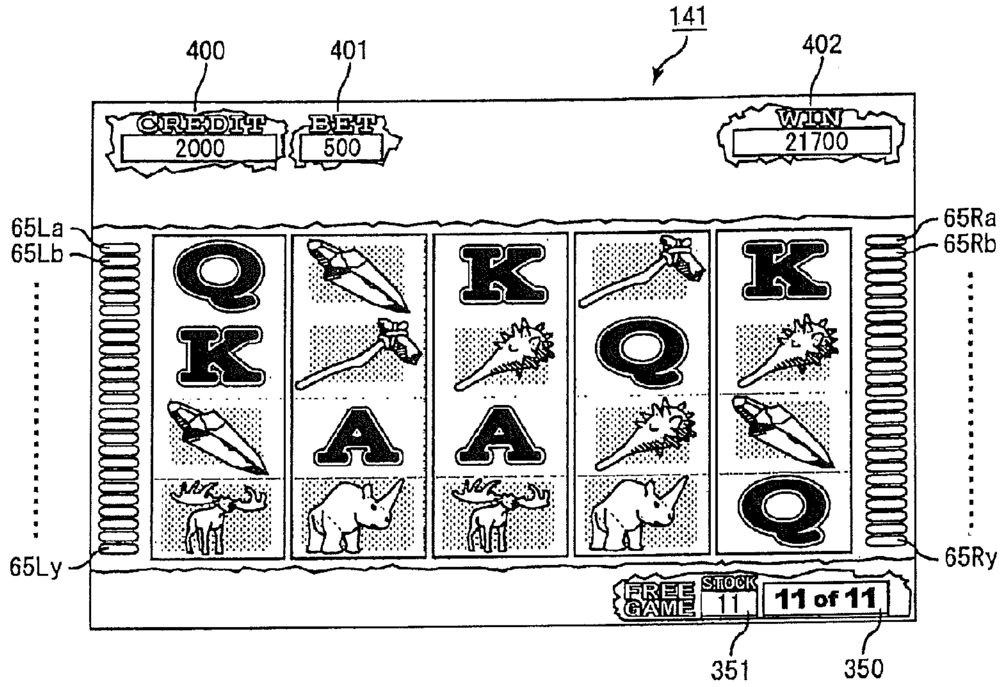
FIG. 1G is a view illustrating an exemplary image displayed to the lower image display panel provided in the gaming machine according to the embodiment of the present invention.

Thereafter, the free game is repeatedly conducted. FIG. 1G shows a state in which the number of executed free games and the number of all free games have become the same.

Figure 1H:
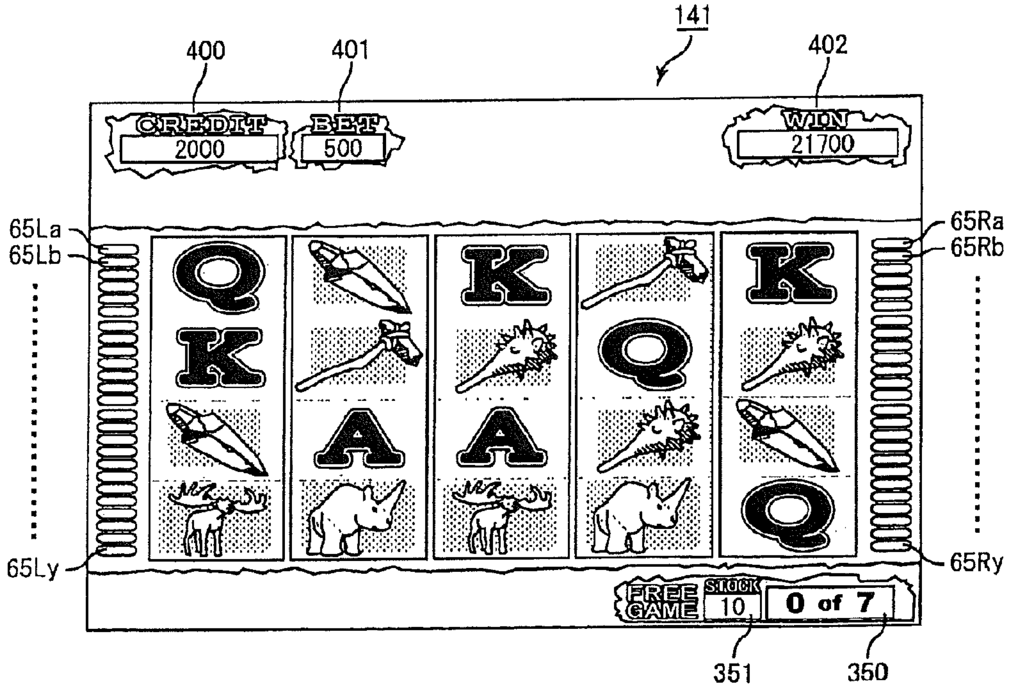
FIG. 1H is a view illustrating an exemplary image displayed to the lower image display panel provided in the gaming machine according to the embodiment of the present invention.

FIG. 1H shows a state in which the number of stocks has decreased from 11 to 10, the number of all free games has become 7, and the number of executed free games has become 0.

As just described, the number of executed free games and the number of all free games becoming the same number results in resetting of the number of executed free games and the number of all free games, subtraction of 1 from the number of stocks, and setting of the specific number of times (7) as the number of all free games.

According to the gaming machine 1 relating to one embodiment of the present invention, three or more trigger symbols 100 are required to be stop-displayed in order for the free game to be generated; however, once the free game has been generated, the number of free games is added even when the number of stop-displayed trigger symbols 100 is less than three. Thus, once the free game is generated, it is possible to give the player an impression that the free game can be played for long periods of time, and to increase a sense of expectation of the player for generation of the free game.

Also, according to the gaming machine 1 relating to one embodiment of the present invention, a larger numeric value being selected can lead to addition of a large number of free games. It is therefore possible to increase a sense of expectation of the player for addition of the number of free games.

According to the gaming machine 1 relating to one embodiment of the present invention, free games are generated when three or more trigger symbols 100 have been stop-displayed in the normal game, while the number of free games is added when three or more trigger symbols have been stop-displayed in the free game; it is therefore possible to maintain the sense of expectation of the player for stop-display of three or more trigger symbols 100, even in the free game.

With reference to FIGS. 1A to 1H, the overview of the present embodiment has been described above.

It is to be noted that FIGS. 1A to 1H also show the states in which a number-of-credits display portion 400, a number-of-BETs display portion 401, and a number-of-payouts display portion 402 are displayed to the lower image display panel 141. The number-of-credits display portion 400 shows the number of credited coins. The number-of-BETs display portion 401 shows the number of betted coins. The number-of-payouts display portion 402 shows the number of coins that are to be paid out.

Hereinafter, the present embodiment is further described in detail.

[Explanation of Function Flow Diagram]

Figure 2:
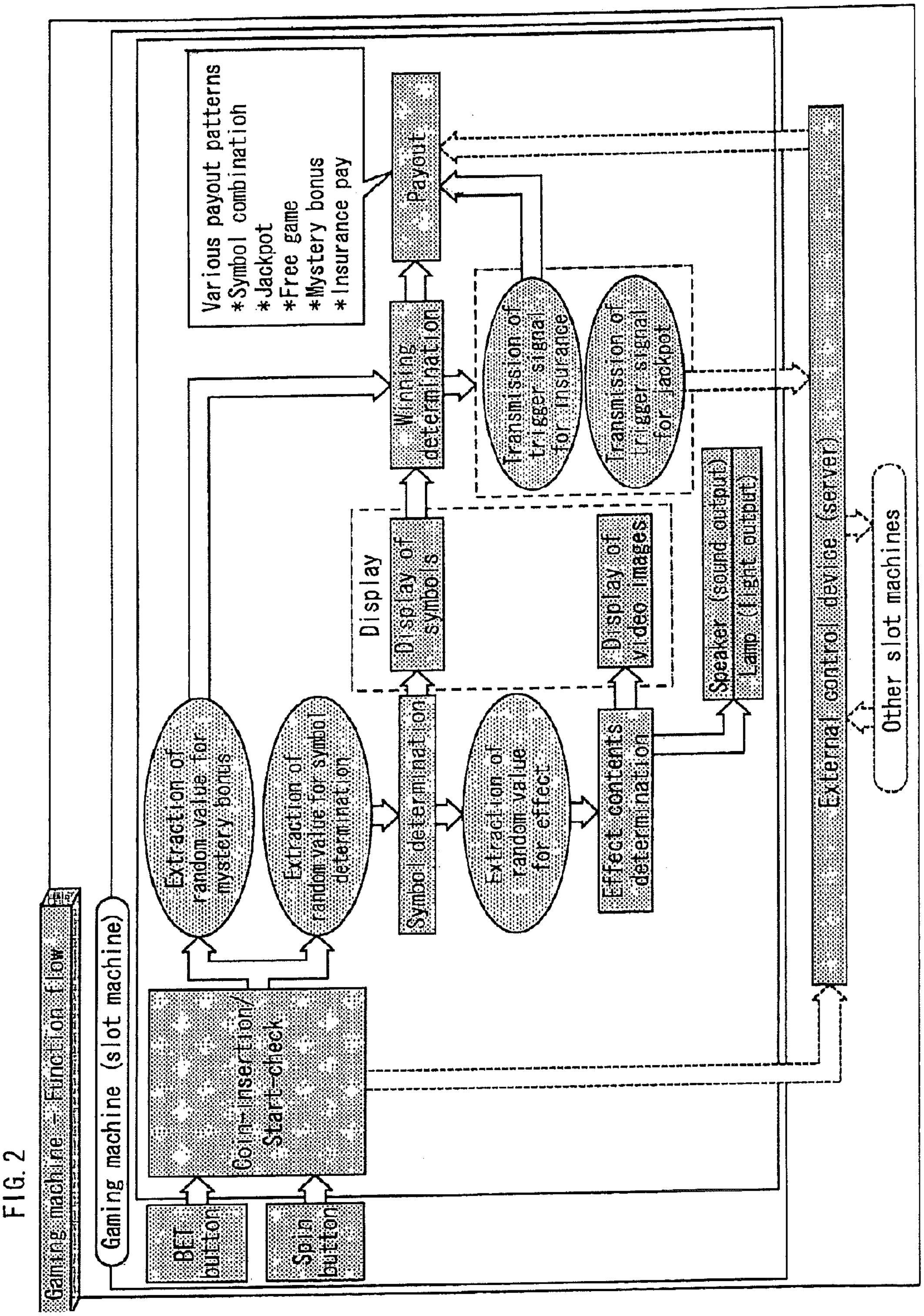
FIG. 2 is a view illustrating a function flow of the gaming machine according to the embodiment of the present invention.

With reference to FIG. 2, basic functions of the gaming machine according to the present embodiment are described.

FIG. 2 is a view illustrating a function flow of the gaming machine according to the embodiment of the present invention.

<Coin-Insertion/Start-Check>

First, the gaming machine checks whether or not a BET button has been pressed by the player, and subsequently checks whether or not a spin button has been pressed by the player.

<Symbol Determination>

Next, when the spin button has been pressed by the player, the gaming machine extracts random values for symbol determination, and determines symbols to be displayed at the time of stopping scrolling of symbol arrays for the player, for a plurality of respective video reels displayed to a display.

<Symbol Display>

Next, the gaming machine starts scrolling of the symbol array of each of the video reels and then stops scrolling so that the determined symbols are displayed for the player.

<Winning Determination>

When scrolling of the symbol array of each video reel has been stopped, the gaming machine determines whether or not a combination of symbols displayed for the player is a combination related to winning.

<Payout>

When the combination of symbols displayed for the player is a combination related to winning, the gaming machine offers benefits according to the combination to the player.

For example, when a combination of symbols related to a payout of coins has been displayed, the gaming machine pays out coins of the number corresponding to the combination of symbols to the player.

Further, when a combination of symbols (trigger symbols) related to a free game trigger has been displayed, the gaming machine starts the free game.

When a combination of symbols related to a jackpot trigger is displayed, the gaming machine pays out coins in an amount of jackpot to the player. The jackpot refers to a function which accumulates parts of coins used by players at the respective gaming machines as the amount of jackpot and which, when the jackpot trigger has been established in any of the gaming machines, pays out coins of the accumulated amount of jackpot to that gaming machine.

In each game, the gaming machine calculates the amount (amount for accumulation) to be accumulated to the amount of jackpot and transmits to an external control device. The external control device accumulates to the amount of jackpot the amounts for accumulation transmitted from the respective gaming machines.

Further, in addition to the aforementioned benefits, the gaming machine is provided with benefits such as a mystery bonus and insurance.

The mystery bonus is a bonus in which a predetermined amount of coins are paid out for winning of a lottery that is intended for the mystery bonus. When the spin button has been pressed, the gaming machine extracts a random value for mystery bonus and determines whether or not to establish a mystery bonus by lottery.

The insurance is a function provided for a purpose of relieving the player from a situation in which a free game has not been played for long periods of time. In the present embodiment, the player can arbitrarily select whether or not to make the insurance effective. Making insurance effective requires a predetermined insurance-purchase amount to be paid in exchange.

In the case where the insurance has been made effective, the gaming machine starts counting the number of games. The gaming machine conducts a payout of coins of the amount that is set for the insurance, when the number of counted games has reached a previously determined number of times without a large amount of payout relating to a free game or the like being conducted.

<Determination of Effects>

The gaming machine produces effects by displaying images to the display, outputting the light from lamps, and outputting sounds from speakers. The gaming machine extracts a random value for effect and determines contents of the effects based on the symbols and the like determined by lottery.

[Overall Game System]

The basic functions of the gaming machine have been described above. Next, with reference to FIG. 3, a game system including the gaming machine is described.

Figure 3:
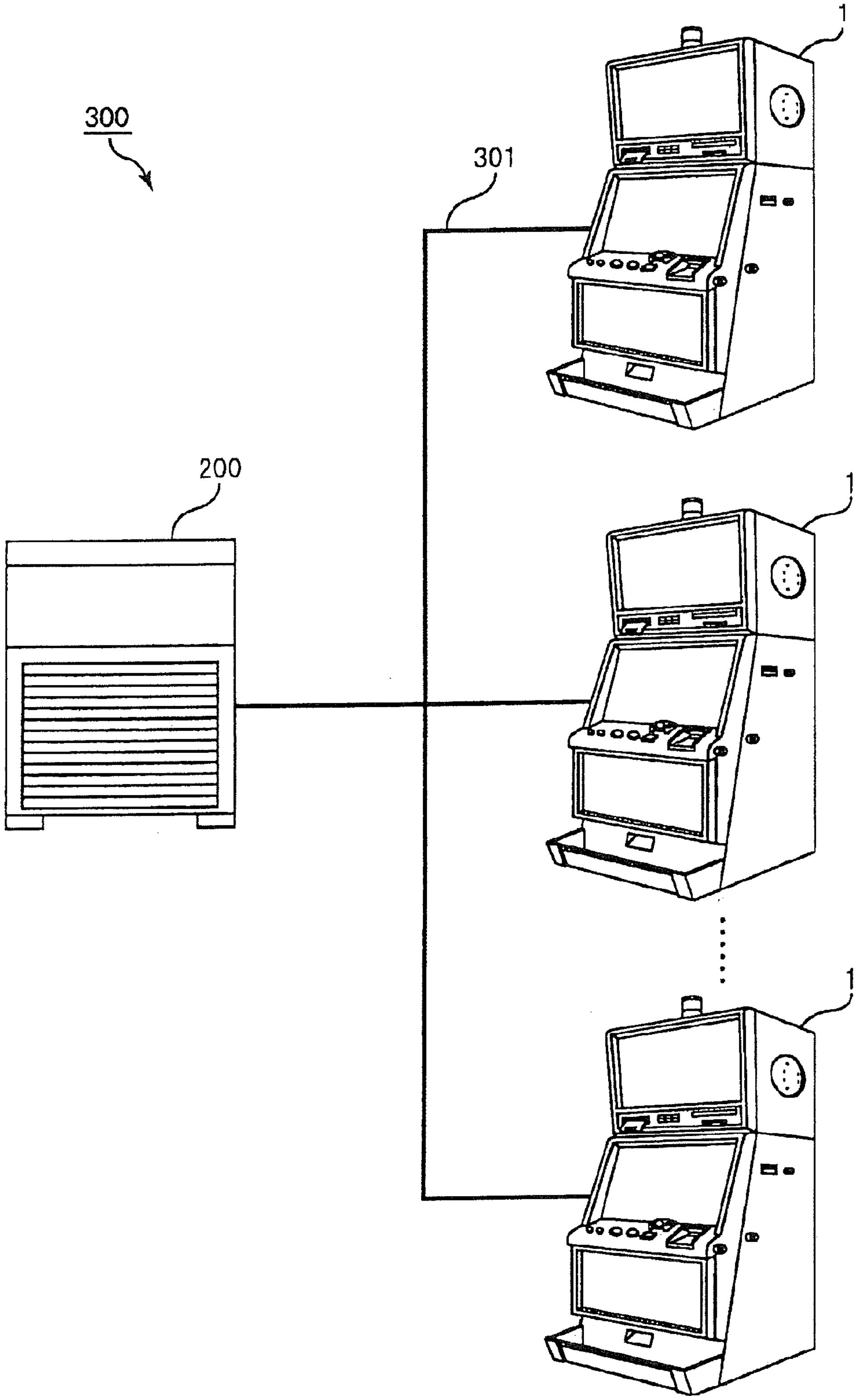
FIG. 3 is a view illustrating a game system including the gaming machine according to the embodiment of the present invention.

FIG. 3 is a view illustrating the game system including the gaming machine according to the embodiment of the present invention.

A game system 300 includes the plurality of gaming machines 1, and an external control device 200 that is connected to each of the gaming machines 1 through a communication line 301.

The external control device 200 is for controlling the plurality of gaming machines 1. In the present embodiment, the external control device 200 is a so-called hall server which is installed in a game facility having the plurality of gaming machines 1. Each of the gaming machines 1 is provided with a unique identification number, and the external control device 200 identifies transmission sources of data transmitted from the respective gaming machines 1 by using the identification numbers. Also in the case where the external control device 200 transmits data to a gaming machine 1, the identification numbers are used for specifying the transmission destination.

It is to be noted that the game system 300 may be constructed within a single game facility where various games can be conducted, such as a casino, or may be constructed among a plurality of game facilities. Further, when the game system 300 is constructed in a single game facility, the game system 300 may be constructed in each floor or section of the game facility. The communication line 301 may be a wired or wireless line, and can adopt a dedicated line, an exchange line or the like.

[Overall Configuration of Gaming Machine]

The game system according to the present embodiment has been described above. Next, with reference to FIG. 4, an overall configuration of the gaming machine 1 is described.

Figure 4:
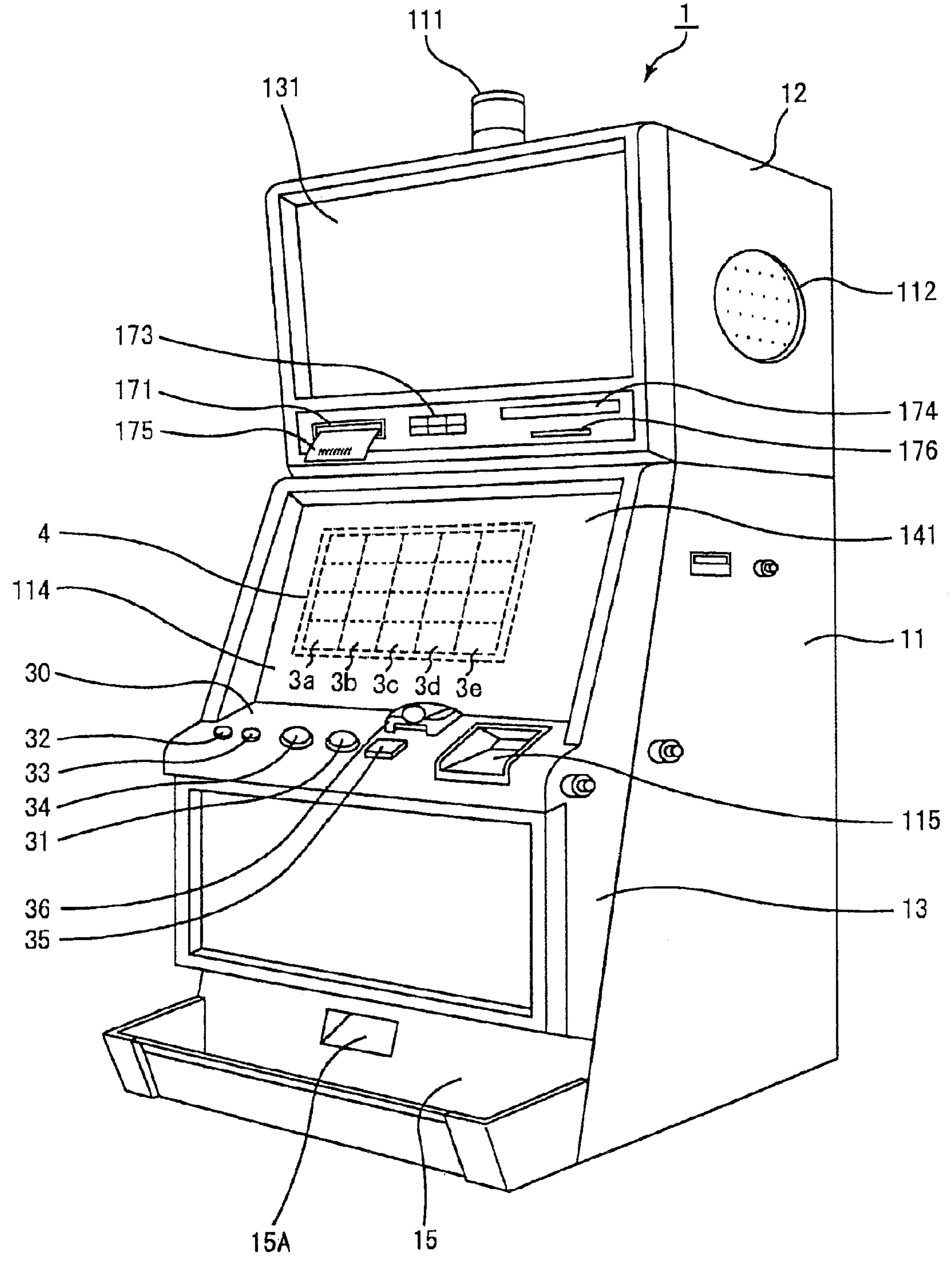
FIG. 4 is a view illustrating an overall configuration of the gaming machine according to the embodiment of the present invention.

FIG. 4 is a view illustrating the overall configuration of the gaming machine according to the embodiment of the present invention.

A coin, a bill, or electrically valuable information corresponding to these is used as a game medium in the gaming machine 1. Further, in the present embodiment, a later-described ticket with a barcode is also used. It is to be noted that the game medium is not limited to these, and for example a medal, a token, electric money or the like can be adopted.

The gaming machine 1 includes a cabinet 11, a top box 12 installed on the upper side of the cabinet 11, and a main door 13 provided at the front face of the cabinet 11.

A lower image display panel 141 is provided at the center of the main door 13. The lower image display panel 141 includes a liquid crystal panel, and forms the display. The lower image display panel 141 has a symbol display region 4. To the symbol display region 4, five video reels 3 (3*a*, 3*b*, 3*c*, 3*d*, 3*e*) are displayed.

In the present embodiment, a video reel depicts through videos the rotational and stop motions of a mechanical reel having a plurality of symbols drawn on the peripheral surface thereof. To each of the video reels 3, a symbol array comprised of a previously determined plurality (22 in the present embodiment) of symbols is assigned (see FIG. 5 which is described later).

In the symbol display region 4, the symbol arrays assigned to the respective video reels 3 are separately scrolled, and are stopped after predetermined time has elapsed. As a result, a part (four consecutive symbols in the present embodiment) of each of the symbol arrays is displayed for the player.

The symbol display region 4 has four regions, namely an upper region, an upper central region, a lower central region, and a lower, region, for each video reel 3, and a single symbol is to be displayed to each region. That is, 20 (=5 columns×4 symbols) symbols are to be displayed in the symbol display region 4.

In the present embodiment, a line formed by selecting one of the aforementioned four regions for each of the video reels 3 and connecting the respective regions is referred to as a winning line (hereinafter also referred to as a "pay line").

It is to be noted that any desired shape of the winning line can be adopted, and examples of the shape of the winning line may include a straight line formed by connecting the upper central regions for the respective video reels 3, a V-shaped line, and a bent line. Also, any desired number of lines can be adopted, and the number can be for example 30 lines.

The lower image display panel 141 corresponds to the symbol display device of the present invention.

It is to be noted that, although the case where the gaming machine 1 is a so-called video slot machine is described in the present embodiment, the gaming machine of the present invention may be configured so that the symbols are stop-displayed by so-called mechanical reels.

The lower image display panel 141 has a built-in touch panel 114. The player can input various commands by touching the lower image display panel 141.

On the lower side of the lower image display panel 141, there are arranged various buttons set in a control panel 30, and various devices to be operated by the player.

A spin button 31 is used when starting scrolling of the symbol arrays of the respective video reels 3. A change button 32 is used when requesting a game facility staff member to exchange money. A CASHOUT button 33 is used when paying out the coins retained inside the gaming machine 1 to a coin tray 15.

A 1-BET button 34 and a maximum BET button 35 are used for determining the number of coins (hereinafter also referred to as "the number of BETs") to be used in the game from the coins retained inside the gaming machine 1. The 1-BET button 34 is used when determining one coin at a time for the aforementioned number of BETs. The maximum BET button 35 is used when setting the aforementioned number of BETs to a defined upper limit number.

A coin accepting slot 36 is provided to accept coins. A bill validator 115 is provided to accept bills. The bill validator 115 validates a bill, and accepts a valid bill into the cabinet 11. It is to be noted that the bill validator 115 may be configured so as to be capable of reading a later-described ticket 175 with a barcode.

An upper image display panel 131 is provided at the front face of the top box 12. The upper image display panel 131 includes a liquid crystal panel, and forms the display. The upper image display panel 131 displays images related to effects and images showing introduction of the game contents and explanation of the game rules. Further, the top box 12 is provided with a speaker 112 and a lamp 111. The gaming machine 1 produces effects by displaying images, outputting sounds, and outputting the light.

A ticket printer 171, a card slot 176, a data display 174, and a keypad 173 are provided on the lower side of the upper image display panel 131.

The ticket printer 171 prints on a ticket a barcode representing encoded data of the number of credits, date, the identification number of the gaming machine 1, and the like, and outputs the ticket as the ticket 175 with a barcode. The player can make a gaming machine read the ticket 175 with a barcode so as to play a game thereon, and can also exchange the ticket 175 with a barcode with a bill or the like at a predetermined place (e.g. a cashier in a casino) in the game facility.

The card slot 176 is for inserting a card in which predetermined data is stored. For example, the card stores data for identifying the player, and data about the history of games played by the player.

When the card is inserted into the card slot 176, a later-described card reader 172 reads data from the card or writes data into the card. It is to be noted that the card may store data corresponding to a coin, a bill or a credit.

The data display 174 includes a fluorescent display, LEDs and the like, and displays the data read by the card reader 172 or the data inputted by the player via the keypad 173, for example. The keypad 173 is for inputting a command and data related to ticket issuance or the like.

[Symbol Arrays of Video Reels]

The overall configuration of the gaming machine 1 has been described above. Next, with reference to FIG. 5, a configuration of the symbol arrays included in the video reels 3 of the gaming machine 1 is described.

FIG. 5 is a view illustrating a symbol table for normal game.

The symbol table for normal game shows the arrangements of symbols drawn on the peripheral surfaces of the reels. A first video reel 3*a*, a second video reel 3*b*, a third video reel 3*c*, a fourth video reel 3*e*, and a fifth video reel 3*d* each is assigned with a symbol array consisting of 22 symbols that correspond to respective code numbers from “00” to “21”.

Types of the symbols provided are “J”, “Q”, “K”, “A”, “KNIFE”, “AXE”, “CLUB”, “DEER”, “RHINOCEROS” “BISON”, “JACKPOT 7”, “SABER TIGER” (“WILD”), and “WHITE TIGER” (“FEATURE”).

[Configuration of Circuit Included in Gaming Machine]

The configuration of the symbol arrays included in the video reels 3 of the gaming machine 1 has been described above. Next, with reference to FIG. 6, a configuration of a circuit included in the gaming machine 1 is described.

Figure 6:
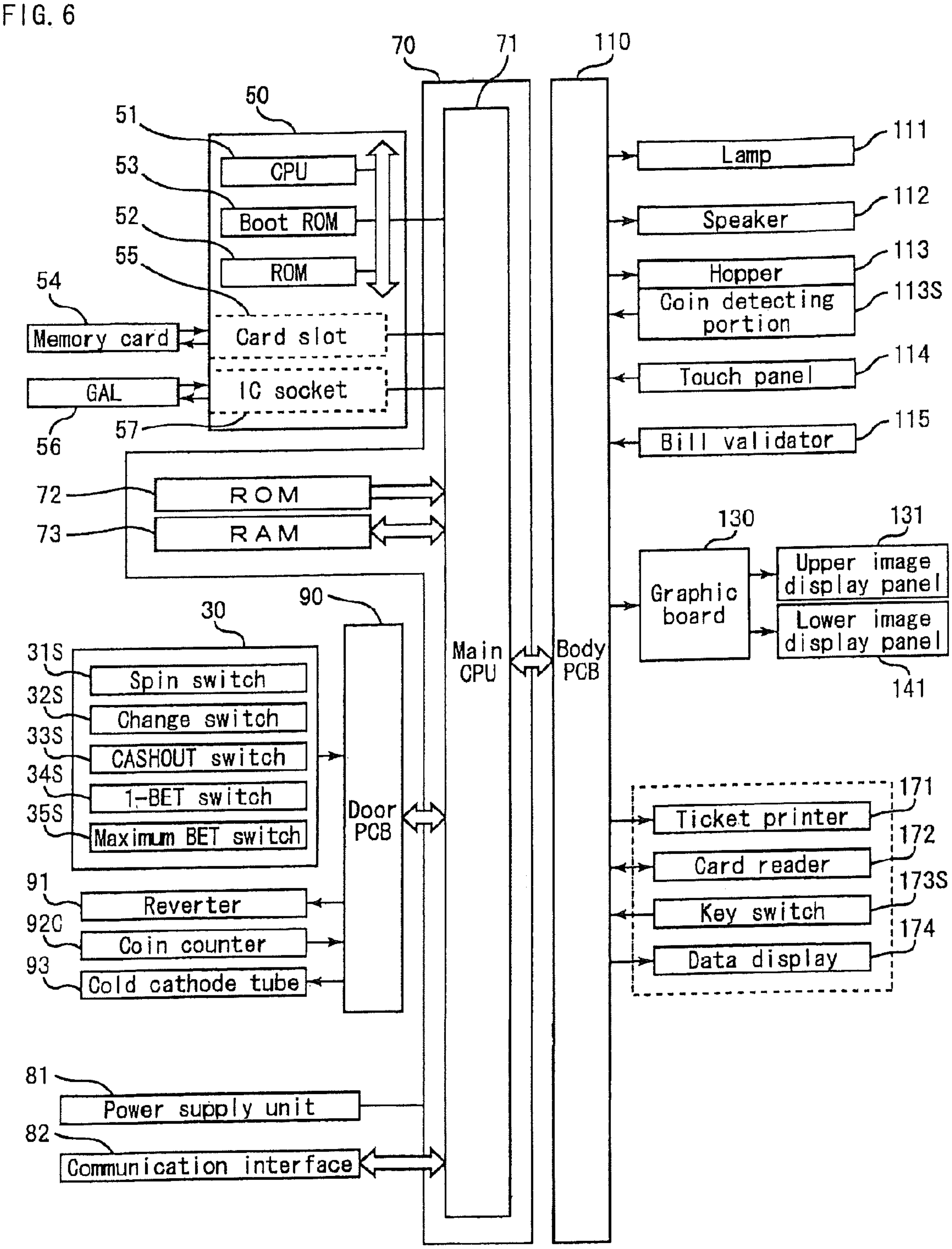
FIG. 6 is a block diagram illustrating an internal configuration of the gaming machine according to the embodiment of the present invention.

FIG. 6 is a block diagram illustrating an internal configuration of the gaming machine according to the embodiment of the present invention.

A gaming board 50 is provided with: a CPU 51, a ROM 52, and a boot ROM 53, which are mutually connected by an internal bus; a card slot 55 corresponding to a memory card 54; and an IC socket 57 corresponding to a GAL (Generic Array Logic) 56.

The memory card 54 includes a non-volatile memory, and stores a game program and a game system program. The game program includes a program related to game progression, a lottery program, and a program for producing effects by images and sounds (e.g. see FIGS. 10 to 22 which are described later). Further, the aforementioned game program includes data (see FIG. 5) specifying the configuration of the symbol array assigned to each video reel 3. The aforementioned game program also includes data showing a number-of-additional-free-games selection table (see FIG. 21).

The lottery program is a program for determining to-be stopped symbol of each video reel 3 by lottery. The to-be stopped symbol is data for determining four symbols to be displayed to the symbol display region 4 out of the 22 symbols forming each symbol array. The gaming machine 1 of the present embodiment determines as the to-be stopped symbol the symbol to be displayed in a predetermined region (the upper region) out of the four regions provided for each of the video reels 3 of the symbol display region 4.

The aforementioned lottery program includes symbol determination data. The symbol determination data is data that specifies random values so that each of the 22 symbols (code numbers from “00” to “21”) forming the symbol array is determined at an equal probability (i.e. $1/22$), for each video reel 3.

The probabilities of the respective 22 symbols being determined are basically equal. However, the numbers of the respective types of symbols included in the 22 symbols vary, and thus the probabilities of the respective types of symbols being determined vary (i.e. different weights on the probabilities are generated). For example, with reference to FIG. 5, the symbol array of the first video reel 3*a* includes one symbol of “RHINOCEROS”, and includes four symbols of “Q”. Hence, the former is determined at the probability of “$1/22$”, whereas the latter is determined at the probability of “$4/22$”.

It is to be noted that, although the data specifies that the equal numbers of symbols be provided to form the symbol arrays of the respective video reels 3 in the present embodiment, different numbers of symbols may form the respective video reels 3. For example, the symbol array of the first video reel 3*a* may consist of 22 symbols whereas the symbol array of the second video reel 3*b* may consist of 30 symbols. Such a configuration increases the degree of freedom in setting the probabilities of the respective types of symbols being determined for each video reel 3.

Further, the card slot 55 is configured so that the memory card 54 can be inserted thereinto and removed therefrom, and is connected to a motherboard 70 by an IDE bus.

The GAL 56 is a type of PLD (Programmable Logic Device) having a fixed OR array structure. The GAL 56 is provided with a plurality of input ports and output ports, and predetermined input into the input port causes output of the corresponding data from the output port.

Further, the IC socket 57 is configured so that the GAL 56 can be inserted thereinto and removed therefrom, and is connected to the motherboard 70 by a PCI bus. The contents of the game to be played on the gaming machine 1 can be changed by replacing the memory card 54 with another memory card 54 having another program written therein or by rewriting the program written into the memory card 54 as another program.

The CPU 51, the ROM 52 and the boot ROM 53 mutually connected by the internal bus are connected to the motherboard 70 by a PCI bus. The PCI bus enables a signal transmission between the motherboard 70 and the gaming board 50, and power supply from the motherboard 70 to the gaming board 50.

The ROM 52 stores an authentication program. The boot ROM 53 stores a pre-authentication program, a program (boot code) to be used by the CPU 51 for activating the pre-authentication program, and the like.

The authentication program is a program (tamper check program) for authenticating the game program and the game system program. The pre-authentication program is a program for authenticating the aforementioned authentication program.

The authentication program and the pre-authentication program are written along a procedure (authentication procedure) for proving that the program to be the subject has not been tampered.

The motherboard 70 is provided with a main CPU 71, a ROM 72, a RAM 73, and a communication interface 82. The motherboard 70 corresponds to the controller of the present invention.

The ROM 72 includes a memory device such as a flash memory, and stores a program such as BIOS to be executed by the main CPU 71, and permanent data. When the BIOS is executed by the main CPU 71, processing for initializing predetermined peripheral devices is conducted; further, through the gaming board 50, processing of loading the game program and the game system program stored in the memory card 54 is started.

The RAM 73 stores data and programs which are used in operation of the main CPU 71. For example, when the processing of loading the aforementioned game program, game system program or authentication program is conducted, the RAM 73 can store the program. The RAM 73 is provided with working areas used for operations in execution of these programs. Examples of the areas include: an area that stores a counter for managing the number of games, the number of BETs, the number of payouts, the number of credits and the like; and an area that stores symbols (code numbers) determined by lottery.

The RAM 73 is further provided with a number-of-free-games storage area and a number-of-stocks storage area.

The number-of-free-games storage area stores number-of-remaining-times data showing the number T of remaining free games.

The number-of-stocks storage area stores number-of-stocks data showing the number S of stocks.

The RAM 73 corresponds to the memory of the present invention. The number-of-stocks data for the period from the generation of a free game to the end of execution of the specific number of free games corresponds to the number-of-retrigger-establishments data of the present invention.

The communication interface 82 is for communicating with the external control device 200 such as a server, through the communication line 301. Further, the motherboard 70 is connected with a later-described door PCB (Printed Circuit Board) 90 and a body PCB 110 by respective USBs. The motherboard 70 is also connected with a power supply unit 81.

When the power is supplied from the power supply unit 81 to the motherboard 70, the main CPU 71 of the motherboard 70 is activated, and then the power is supplied to the gaming board 50 through the PCI bus so as to activate the CPU 51.

The door PCB 90 and the body PCB 110 are connected with input devices such as a switch and a sensor, and peripheral devices the operations of which are controlled by the main CPU 71.

The door PCB 70 is connected with a control panel 30, a reverter 91, a coin counter 92C and a cold cathode tube 93.

The control panel 30 is provided with a spin switch 31S, a change switch 32S, a CASHOUT switch 33S, a 1-BET switch 34S and a maximum BET switch 35S which correspond to the aforementioned respective buttons. Each of the switches outputs a signal to the main CPU 71 upon detection of press of the button corresponding thereto by the player.

The coin counter 92C validates a coin inserted into the coin accepting slot 36 based on its material, shape and the like, and outputs a signal to the main CPU 71 upon detection of a valid coin. Invalid coins are discharged from a coin payout exit 15A.

The reverter 91 operates based on a control signal outputted from the main CPU 71, and distributes valid coins validated by the coin counter 92C into a hopper 113 or a cash box (not illustrated). That is, coins are distributed into the hopper 113 when the hopper 113 is not filled with coins, while coins are distributed into the cash box when the hopper 113 is filled with coins.

The cold cathode tube 93 functions as a backlight installed on the rear face sides of the upper image display panel 131 and the lower image display panel 141, and lights up based on a control signal outputted from the main CPU 71.

The body PCB 110 is connected with the lamp 111, the speaker 112, the hopper 113, a coin detecting portion 1135, the touch panel 114, the bill validator 115, a graphic board 130, the ticket printer 171, the card reader 172, a key switch 1735 and the data display 174.

The lamp 111 lights up based on a control signal outputted from the main CPU 71. The speaker 112 outputs sounds such as BGM, based on a control signal outputted from the main CPU 71.

The hopper 113 operates based on a control signal outputted from the main CPU 71, and pays out coins of the specified number of payouts from the coin payout exit 15A to the coin tray 15. The coin detecting portion 113S outputs a signal to the main CPU 71 upon detection of coins paid out by the hopper 113.

The touch panel 114 detects a place on the lower image display panel touched by the player's finger or the like, and outputs to the main CPU 71*a* signal corresponding to the detected place. Upon acceptance of a valid bill, the bill validator 115 outputs to the main CPU 71*a* signal corresponding to the face amount of the bill.

The graphic board 130 controls display of images conducted by the respective upper image display panel 131 and lower image display panel 141, based on a control signal outputted from the main CPU 71. The symbol display region 4 of the lower image display panel 141 displays the five video reels 3 by which the scrolling and stop motions of the symbol arrays included in the respective video reels 3 are displayed. The graphic board 130 is provided with a VDP generating image data, a video RAM temporarily storing the image data generated by the VDP, and the like.

A number-of-stocks display portion 351 of the lower image display panel 141 displays the number S of stocks shown by the number-of-stocks data stored in the number-of-stocks storage area of the RAM 73. The lower image display panel 141 corresponds to the display of the present invention.

The graphic board 130 is provided with the VDP (Video Display Processor) generating image data based on a control signal outputted from the main CPU 71, the video RAM temporarily storing the image data generated by the VDP, and the like. It is to be noted that the image data used in generation of image data by the VDP is included in the game program that has been read from the memory card 54 and stored into the RAM 73.

Based on a control signal outputted from the main CPU 71, the ticket printer 171 prints on a ticket a barcode representing encoded data of the number of credits stored in the RAM 73, date, the identification number of the gaming machine 1, and the like, and then outputs the ticket as the ticket 175 with a barcode.

The card reader 172 reads data stored in a card inserted into the card slot 176 and transmits the data to the main CPU 71, or writes data into the card based on a control signal outputted from the main CPU 71.

The key switch 173S is provided in the keypad 173, and outputs a predetermined signal to the main CPU 71 when the keypad 173 has been operated by the player.

The data display 174 displays data read by the card reader 172 and data inputted by the player through the keypad 173, based on a control signal outputted from the main CPU 71.

[Determination of Number of Payouts]

The circuit configuration of the gaming machine 1 has been described above. Next, with reference to FIGS. 7 to 9, determination of the number of payouts is described.

Figure 7:
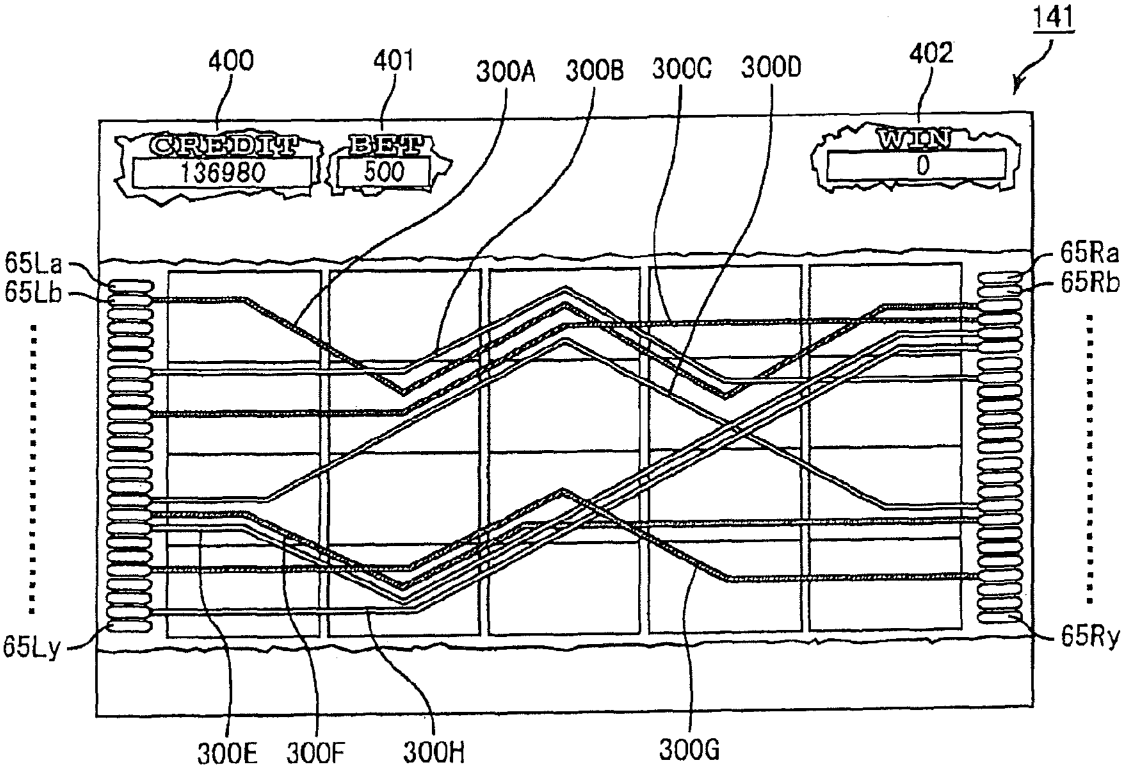
FIG. 7 is a view illustrating an exemplary image displayed to the lower image display panel provided in the gaming machine according to the embodiment of the present invention.

FIG. 7 is a view illustrating an exemplary image displayed to the lower image display panel provided in the gaming machine according to the embodiment of the present invention.

FIG. 8 is a view illustrating a number-of-payouts determination table.

Figure 9A:
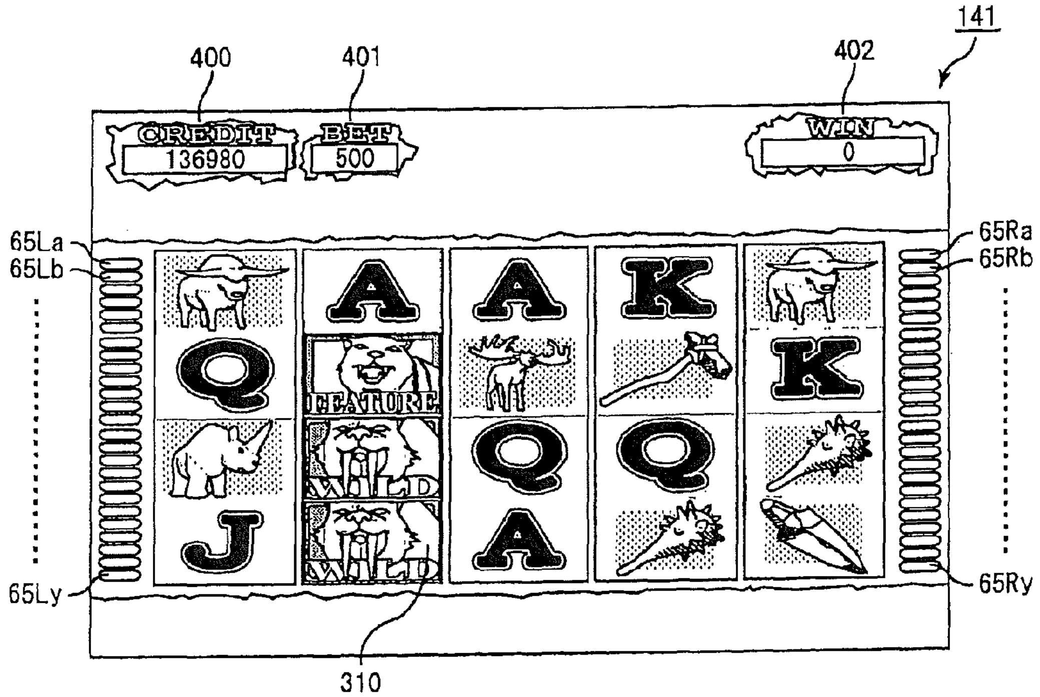
FIG. 9A is a view illustrating an exemplary image displayed to the lower image display panel provided in the gaming machine according to the embodiment of the present invention.
Figure 9B:
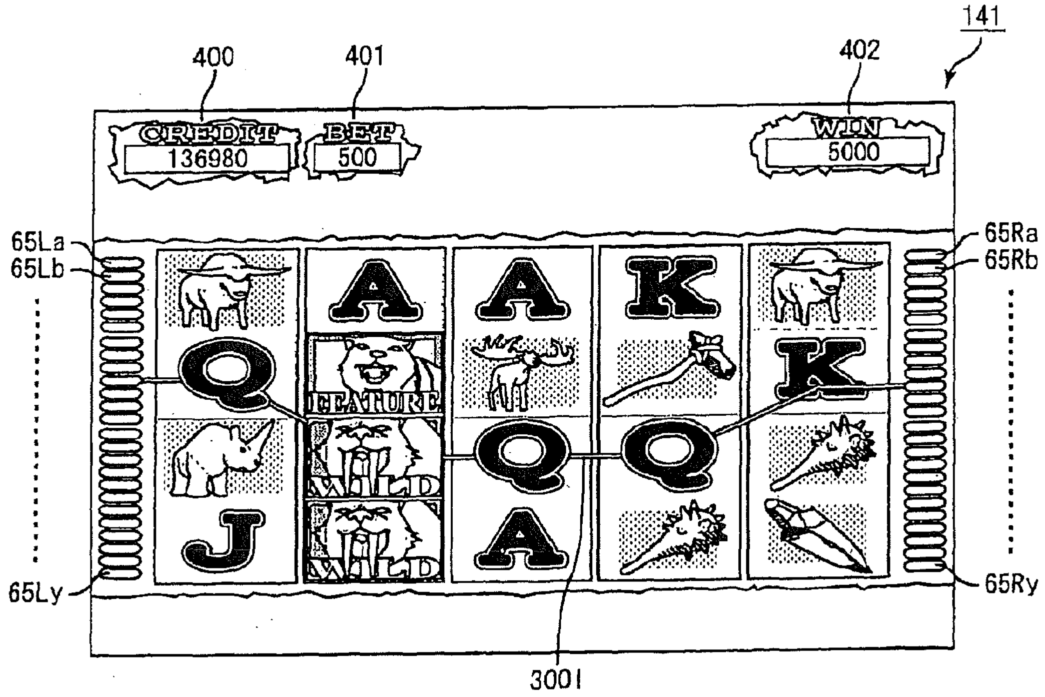
FIG. 9B is a view illustrating an exemplary image displayed to the lower image display panel provided in the gaming machine according to the embodiment of the present invention.

FIG. 9A and FIG. 9B are views illustrating an exemplary image displayed to the lower image display panel provided in the gaming machine according to the embodiment of the present invention.

As shown in FIG. 7, twenty five pay-line generating portions 65L (65La, 65Lb, 65Lc, 65Ld, 65Le, 65Lf, 65Lg, 65Lh, 65Li, 65Lj, 65Lk, 65Ll, 65Lm, 65Ln, 65Lo, 65Lp, 65Lq, 65Lr, 65Ls, 65Lt, 65Lu, 65Lv, 65Lw, 65Lx, 65Ly) are displayed on the left side of the symbol display region 4.

Similarly, twenty five pay-line generating portions 65R (65Ra, 65Rb, 65Rc, 65Rd, 65Re, 65Rf, 65Rg, 65Rh, 65Ri, 65Rj, 65Rk, 65Rl, 65Rm, 65Rn, 65Ro, 65Rp, 65Rq, 65Rr, 65Rs, 65Rt, 65Ru, 65Rv, 65Rw, 65Rx, 65Ry) are displayed on the right side of the symbol display region 4.

Each of the pay-line generating portions 65L is paired with one of the pay-line generating portions 65R. Pay lines 300 (winning lines L) are previously defined which are lines from the respective pay-line generating portions 65L to the pay-line generating portions 65R paired therewith. A pay line 300A connects the pay-line generating portion 65Lb and the pay-line generating portion 65Rc. A pay line 300B connects the pay-line generating portion 65Lg and the pay-line generating portion 65Rh. A pay line 300C connects the pay-line generating portion 65Lj and the pay-line generating portion 65Rd. A pay line generating portion 300D connects the pay-line generating portion 65Lp and the pay-line generating portion 65Rq. A pay line 300E connects the pay-line generating portion 65Lr and the pay-line generating portion 65Re. A pay line 300F connects the pay-line generating portion 65Lq and the pay-line generating portion 65Rr. A pay line 300G connects the pay-line generating portion 65Lu and the pay-line generating portion 65Rv. A pay line 300H connects the pay-line generating portion 65Lx and the pay-line generating portion 65Rf.

It is to be noted that, although only eight pay lines 300 are drawn in FIG. 7 in order to simplify the explanation, fifty pay lines 300 are defined in the present embodiment.

The number-of-payouts determination table (see FIG. 8) shows correspondence relationships among the types and the numbers of symbols rearranged along the pay line, and the numbers of payouts.

In the present embodiment, it is determined as winning when at least one combination of three or more symbols of the same type out of "J", "Q", "K", "A", "KNIFE", "AXE", "CLUB", "DEER", "RHINOCEROS", "BISON" and "JACKPOT 7" has been rearranged along one of the pay lines 300.

With regard to "SABER TIGER" ("WILD"), it is determined as winning when three or more symbols thereof have been rearranged along one of the pay lines 300 in the normal game. However, it is not determined as winning when three or more symbols of "SABER TIGER" ("WILD") have been displayed along one of the pay lines 300 in the free game.

In the free game, the symbol of "SABER TIGER" ("WILD") is a symbol (wild symbol) that can be replaced by another symbol. That is, in the free game, displaying of two symbols of "J" and one symbol of "WILD" along the pay line is regarded as displaying of three symbols of "J" along the pay line, and it is determined as winning.

For example, when symbols have been rearranged in the way of the example shown in FIG. 9 in the free game, the number of payouts is determined as described below.

First, when the symbols have been rearranged as shown in FIG. 9A, a pay line 300I is displayed as shown in FIG. 9B. Three symbols of "Q", one symbol of "WILD", and one symbol of "K" are rearranged along the pay line 300I.

In this case, it is considered as a rearrangement of four symbols of "Q", and thus 5000, obtained by multiplying 500 (the number of betted coins) by 10, is determined as the number of payouts of coins.

When three or more symbols of "JACKPOT 7" have been rearranged, "jackpot" is determined as the winning combination.

Also, when three or more symbols of "WHITE TIGER" ("FEATURE") being the trigger symbols have been rearranged, "free game trigger" is determined as the winning combination.

[Contents of Program]

The determination of the number of payouts has been described above. Next, with reference to FIGS. 10 to 22, the program to be executed by the gaming machine 1 is described.

<Main Control Processing>

First, with reference to FIG. 10, main control processing is described.

FIG. 10 is a view illustrating a flowchart of the main control processing for the gaming machine according to the embodiment of the present invention.

First, when the power is supplied to the gaming machine 1, the main CPU 71 reads the authenticated game program and game system program from the memory card 54 through the gaming board 50, and writes the programs into the RAM 73 (step S11).

Next, the main CPU 71 conducts at-one-game-end initialization processing (step S12). For example, data that becomes unnecessary after each game in the working areas of the RAM 73, such as the number of BETs and the symbols determined by lottery, is cleared.

The main CPU 71 conducts coin-insertion/start-check processing which is described later with reference to FIG. 11 (step S13). In the processing, input from the BET switch and the spin switch is checked.

The main CPU 71 then conducts symbol lottery processing which is described later with reference to FIG. 14 (step S14). In the processing, to-be stopped symbols are determined based on the symbol table for normal game and the random values for symbol determination.

Next, the main CPU 71 conducts mystery bonus lottery processing (step S15). In the processing, lottery determining whether or not to establish a mystery bonus trigger is held. For example, the main CPU 71 extracts a random value for mystery bonus from the numbers in a range of "0 to 99", and establishes the mystery bonus trigger when the extracted random value is "0".

The main CPU 71 conducts effect contents determination processing (step S16). The main CPU 31 extracts a random value for effect, and determines any of the effect contents from the preset plurality of effect contents by lottery.

The main CPU 71 then conducts symbol display control processing which is described later with reference to FIG. 15 (step S17). In the processing, scrolling of the symbol array of each video reel 3 is started, and the to-be stopped symbol determined in the symbol lottery processing of step S14 is stopped at a predetermined position (e.g. the upper region in the symbol display region 4). That is, four symbols including the to-be stopped symbol are displayed in the symbol display region 4. For example, when the to-be stopped symbol is the symbol associated with the code number of "10" and it is to be displayed to the upper region, the symbols associated with the respective code numbers of "11", "12" and "13" are to be displayed to the respective upper central region, lower central region and lower region in the symbol display region 4.

Next, the main CPU 71 conducts number-of-payouts determination processing which is described later with reference to FIG. 16 (step S18). In the processing, the number of payouts is determined based on the combination of symbols displayed along one of the winning lines L (pay lines 300), and is stored into a number-of-payouts counter provided in the RAM 73.

The main CPU 71 then determines whether or not three or more trigger symbols 100 (see FIG. 1A) have been rearranged (step S19). In the processing, the main CPU 71 determines whether or not three or more trigger symbols 100 have been rearranged in the symbol display region 4, without taking the winning lines L (pay lines 300) into consideration.

When the main CPU 71 determines that three or more trigger symbols 100 (see FIG. 1A) have been rearranged, the main CPU 71 conducts free-game execution processing (step S20). The free-game execution processing is described in detail later with reference to FIG. 18.

When determining in step S19 that three or more trigger symbols 100 have not been rearranged or after executing the processing of step S20, the main CPU 71 determines whether or not the mystery bonus trigger is established (step S21). When determining that the mystery bonus trigger has been established, the main CPU 71 conducts the mystery bonus processing (step S22). In the processing, the number of payouts (e.g. 300) being set for the mystery bonus is stored into the number-of-payouts counter provided in the RAM 73.

After the processing of step S22 or when determining in step S21 that the mystery bonus trigger has not been established, the main CPU 71 conducts insurance-check processing which is described later with reference to FIG. 17 (step S23). In the processing, whether or not to conduct payout by the insurance is checked.

The main CPU 71 conducts payout processing (step S24). The main CPU 71 adds the value stored in the number-of-payouts counter to a number-of-credits counter provided in the RAM 73. It is to be noted that operations of the hopper 113 may be controlled based on input from the CASHOUT switch 33S, and coins of the number corresponding to the value stored in the number-of-payouts counter may be discharged from the coin payout exit 15A. Further, operations of the ticket printer 171 may be controlled and a ticket with a barcode may be issued on which a value stored in the number-of-payouts counter is recorded. After the processing has been conducted, the processing is shifted to step S12.

<Coin-Insertion/Start-Check Processing>

Figure 11:
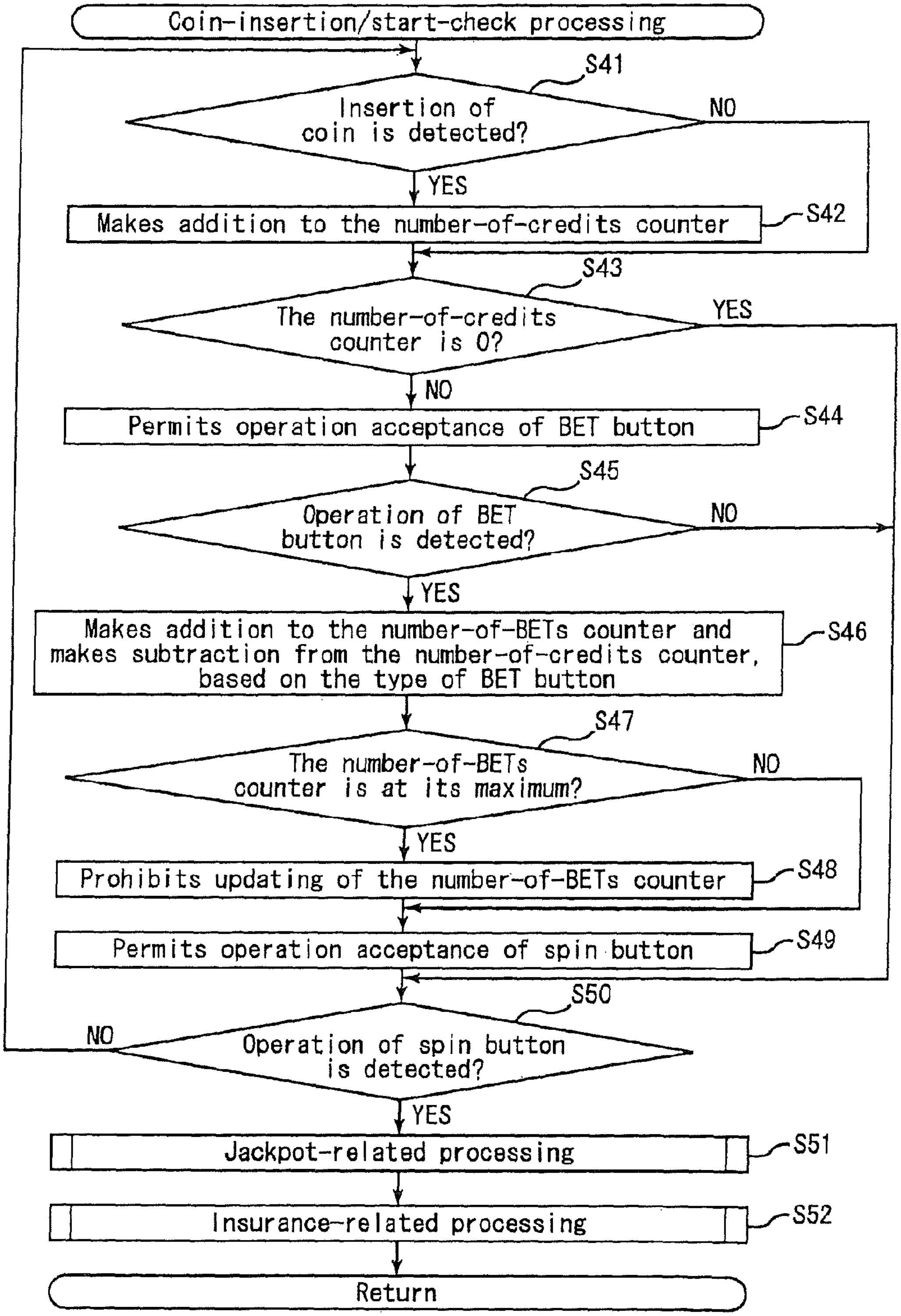
FIG. 11 is a flowchart illustrating coin-insertion/start-check processing for the gaming machine according to the embodiment of the present invention.

Next, with reference to FIG. 11, coin-insertion/start-check processing is described.

FIG. 11 is a view illustrating a flowchart of the coin-insertion/start-check processing for the gaming machine according to the embodiment of the present invention.

First, the main CPU 71 determines whether or not insertion of a coin has been detected by the coin counter 92C (step S41). When determining that the insertion of a coin has been detected, the main CPU 71 makes an addition to the number-of-credits counter (step S42). It is to be noted that, in addition to the insertion of a coin, the main CPU 71 may determine whether or not insertion of a bill has been detected by the bill validator 115, and when determining that the insertion of a bill has been detected, the main CPU 71 may add a value according to the bill to the number-of-credits counter.

After step S42 or when determining in step S41 that the insertion of a coin has not been detected, the main CPU 71 determines whether or not the number-of-credits counter is zero (step S43). When the main CPU 71 determines that the number-of-credits counter is not zero, the main CPU 71 permits operation acceptance of the BET buttons (step S44).

Next, the main CPU 71 determines whether or not operation of any of the BET buttons has been detected (step S45). When the main CPU 71 determines that the BET switch has detected press of the BET button by the player, the main CPU 71 makes an addition to a number-of-BETs counter provided in the RAM 73 and makes a subtraction from the number-of-credits counter, based on the type of the BET button (step S46).

The main CPU 71 then determines whether or not the number-of-BETs counter is at its maximum (step S47). When the main CPU 71 determines that the number-of-BETs counter is at its maximum, the main CPU 71 prohibits updating of the number-of-BETs counter (step S48). After step S48 or when determining in step S47 that the number-of-BETs counter is not at its maximum, the main CPU 71 permits operation acceptance of the spin button (step S49).

After step S49 or when determining in step S45 that the operation of any of the BET buttons has not been detected, or when determining in step S43 that the number-of-credits counter is zero, the main CPU 71 determines whether or not operation of the spin button has been detected (step S50). When the main CPU 71 determines that the operation of the spin button has not been detected, the processing is shifted to step S41.

When the main CPU 71 determines that the operation of the spin button has been detected, the main CPU 71 conducts jackpot-related processing which is described later with reference to FIG. 12 (step S51). In the processing, the amount to be accumulated to the amount of jackpot is calculated, and the amount is transmitted to the external control device 200.

Next, the main CPU 71 conducts insurance-related processing which is described later with reference to FIG. 13 (step S52). In the processing, counting of the number of games is conducted which triggers a payout by the insurance. After the processing has been conducted, the coin-insertion/start-check processing is completed.

<Jackpot-Related Processing>

Figure 12:
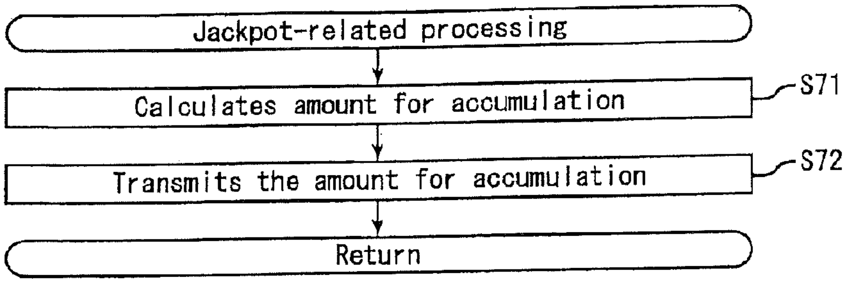
FIG. 12 is a view illustrating a flowchart of jackpot-related processing for the gaming machine according to the embodiment of the present invention.

Now, with reference to FIG. 12, the jackpot-related processing is described.

FIG. 12 is a view illustrating a flowchart of the jackpot-related processing for the gaming machine according to the embodiment of the present invention.

First, the main CPU 71 calculates the amount for accumulation (step S71). The main CPU 71 obtains the product of the value of the number-of-BETs counter and a preset accumulation ratio, so that the amount for accumulation to the amount of jackpot is calculated.

Next, the main CPU 71 transmits the calculated amount for accumulation to the external control device 200 (step S72). Upon reception of the amount for accumulation, the external control device 200 updates the amount of jackpot. After the processing has been conducted, the jackpot-related processing is completed.

<Insurance-Related Processing>

Figure 13:
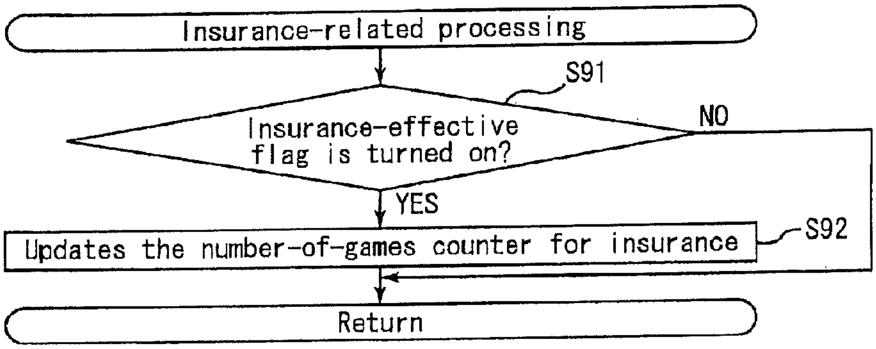
FIG. 13 is a view illustrating a flowchart of insurance-related processing for the gaming machine according to the embodiment of the present invention.

Next, with reference to FIG. 13, the insurance-related processing is described.

FIG. 13 is a view illustrating a flowchart of the insurance-related processing for the gaming machine according to the embodiment of the present invention.

First, the main CPU 71 determines whether or not an insurance-effective flag is turned on (step S91). The insurance-effective flag is turned on when a command to make the insurance effective is inputted by the player in the insurance selection processing which is described later with reference to FIG. 22.

When the main CPU 71 determines that the insurance-effective flag is not turned on, the main CPU 71 completes the insurance-related processing. On the other hand, when the main CPU 71 determines that the insurance-effective flag is turned on, the main CPU 71 updates a number-of-games counter for insurance provided in the RAM 73 (step S92). The number-of-games counter for insurance is a counter for managing the number of games up to the time of the payout by the insurance. In the processing of step S92, the main CPU 71 adds one to the number-of-games counter for insurance. After the processing has been conducted, the insurance-related processing is completed.

<Symbol Lottery Processing>

Figure 14:
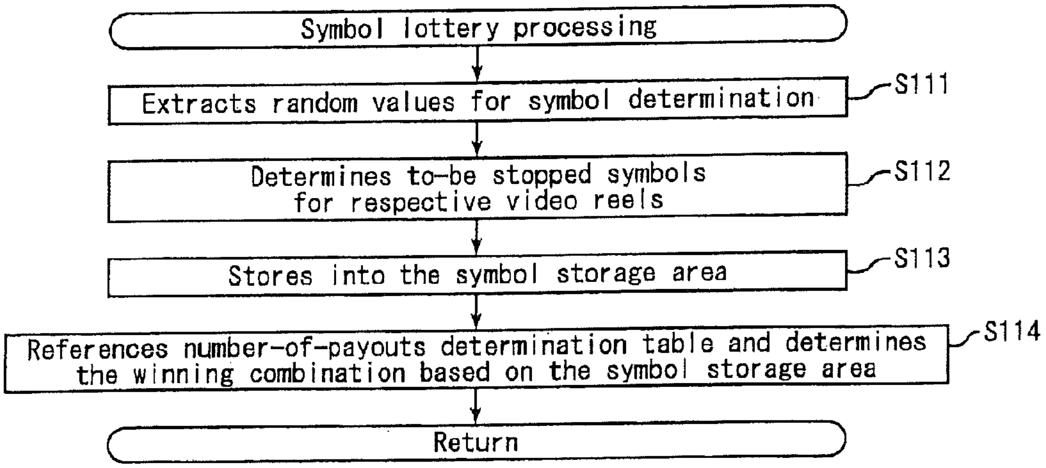
FIG. 14 is a view illustrating a flowchart of symbol lottery processing for the gaming machine according to the embodiment of the present invention.

Next, with reference to FIG. 14, the symbol lottery processing is described.

FIG. 14 is a view illustrating a flowchart of the symbol lottery processing for the gaming machine according to the embodiment of the present invention.

First, the main CPU 71 extracts random values for symbol determination (step S111). The main CPU 71 then determines to-be stopped symbols for the respective video reels 3 by lottery (step S112). The main CPU 71 holds a lottery for each video reel 3, and determines any one of the 22 symbols (code numbers from "00" to "21") as a to-be stopped symbol. At this time, each of the 22 symbols (code numbers from "00" to "21") is determined at an equal probability (i.e. 1/22).

The main CPU 71 then stores the determined to-be stopped symbols for the respective video reels 3 into a symbol storage area provided in the RAM 73 (step S113). Next, the main CPU 71 references the number-of-payouts determination table (FIG. 8) and determines a winning combination based on the symbol storage area (step S114). The main CPU 71 determines the winning combination based on the combination of symbols to be displayed along the winning line by the respective video reels 3 and the number-of-payouts determination table. After the processing has been conducted, the symbol lottery processing is completed.

<Symbol Display Control Processing>

Figure 15:
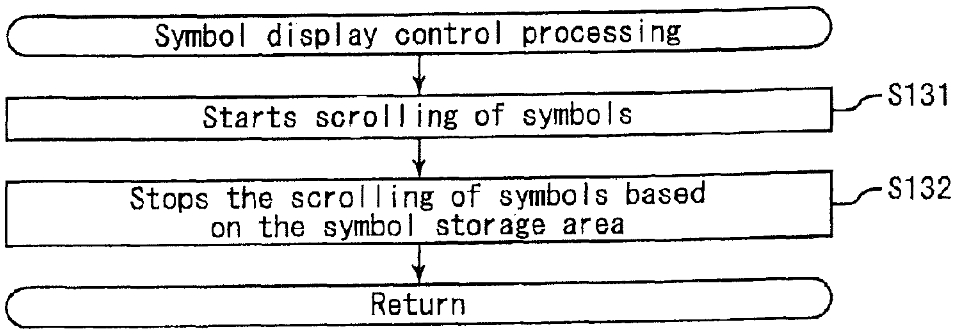
FIG. 15 is a view illustrating a flowchart of symbol display control processing for the gaming machine according to the embodiment of the present invention.

Next, with reference to FIG. 15, the symbol display control processing is described.

FIG. 15 is a view illustrating a flowchart of the symbol display control processing for the gaming machine according to the embodiment of the present invention.

First, the main CPU 71 starts scrolling of the symbol arrays of the respective video reels 3 that are displayed to the symbol display region 4 of the lower image display panel 141 (step S131). The main CPU 71 then stops the scrolling of the symbol arrays of the respective video reels 3, based on the aforementioned symbol storage area (step S132). After the processing has been conducted, the symbol display control processing is completed.

<Number-of-Payouts Determination Processing>

Figure 16:
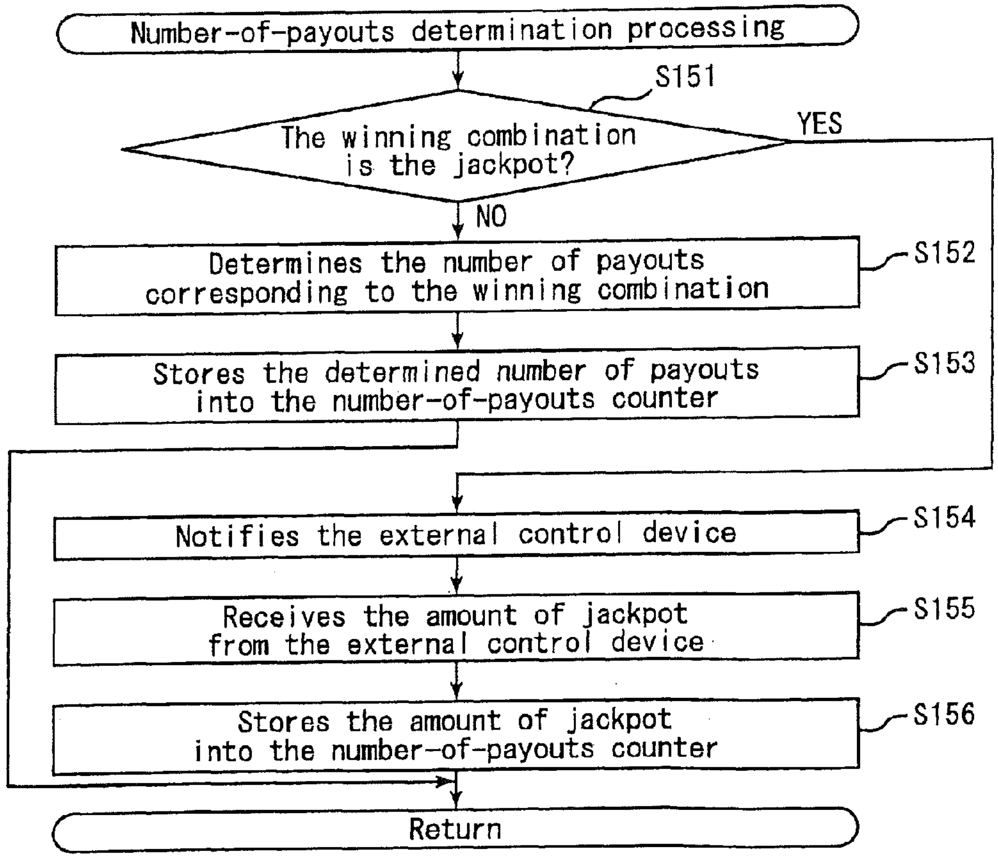
FIG. 16 is a view illustrating a flowchart of number-of-payouts determination processing for the gaming machine according to the embodiment of the present invention.

Next, with reference to FIG. 16, the number-of-payouts determination processing is described.

FIG. 16 is a view illustrating a flowchart of the number-of-payouts determination processing for the gaming machine according to the embodiment of the present invention.

The main CPU 71 first determines whether or not the winning combination is the jackpot (step S151). When the main CPU 71 determines that the winning combination is not the jackpot, the main CPU 71 determines the number of payouts corresponding to the winning combination (step S152). The determination of the number of payouts is conducted in the way described with reference to FIGS. 7 to 9. It is to be noted that the main CPU 71 determines "0" as the number of payouts in the case where the game is lost. Next, the main CPU 71 stores the determined number of payouts into the number-of-payouts counter (step S153). After the processing has been conducted, the number-of-payouts determination processing is completed.

When the main CPU 71 determines that the winning combination is the jackpot, the main CPU 71 notifies the external control device 200 of the winning of the jackpot (step S154). It is to be noted that, upon reception of the notification, the external control device 200 transmits to the gaming machine 1 the amount of jackpot having updated up to that time. At this time, a part (e.g. 80%) of the amount of jackpot may be the payout subject and the rest (e.g. 20%) may be carried over for the upcoming establishment of the jackpot trigger.

Next, the main CPU 71 receives the amount of jackpot from the external control device 200 (step S155). The main CPU 71 then stores the received amount of jackpot into the number-of-payouts counter (step S156). After the processing has been conducted, the number-of-payouts determination processing is completed.

<Insurance-Check Processing>

Figure 17:
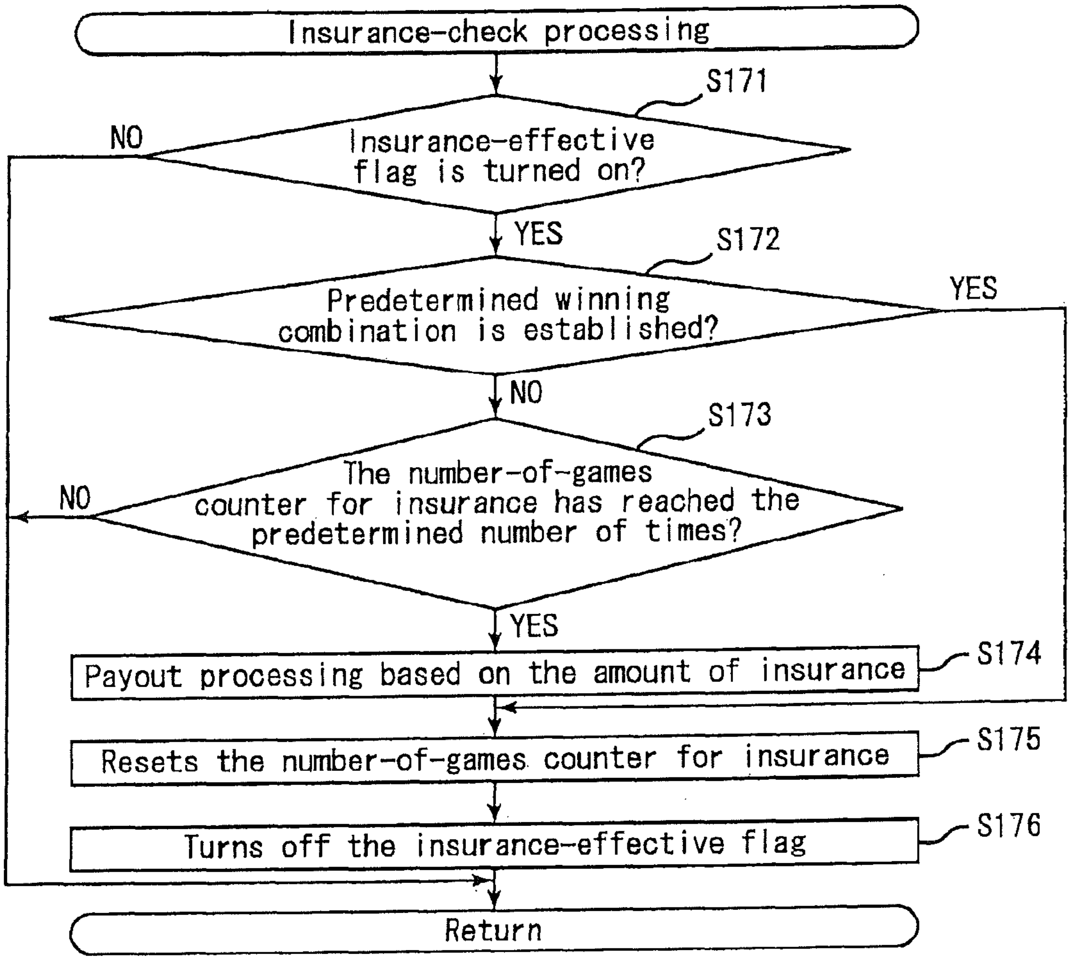
FIG. 17 is a view illustrating a flowchart of insurance-check processing for the gaming machine according to the embodiment of the present invention.

Next, with reference to FIG. 17, the insurance-check processing is described.

FIG. 17 is a view illustrating a flowchart of the insurance-check processing for the gaming machine according to the embodiment of the present invention.

First, the main CPU 71 determines whether or not the insurance-effective flag is turned on (step S171). When the main CPU 71 determines that the insurance-effective flag is not turned on, the main CPU 71 completes the insurance-check processing.

When the main CPU 71 determines that the insurance-effective flag is turned on, the main CPU 71 determines whether or not a predetermined winning combination has been established (step S172). In the present embodiment, "free game trigger", "jackpot" and "mystery bonus" are subjects of the predetermined winning combination.

When the main CPU 71 determines that the predetermined winning combination has not been established, the main CPU 71 determines whether or not the number-of-games counter for insurance has reached a predetermined number of times (e.g. 300) (step S173). When the main CPU 71 determines that the number-of-games counter for insurance has not reached the predetermined number of times, the main CPU 71 completes the insurance-check processing.

When the main CPU 71 determines that the number-of-games counter for insurance has reached the predetermined number of times, the main CPU 71 conducts payout processing based on the amount of insurance (step S174). The main CPU 31 adds an amount (e.g. 200) previously set as the amount of insurance to the number-of-credits counter.

After step S174 or when determining in step S172 that the predetermined winning combination has been established, the main CPU 71 resets the number-of-games counter for insurance (step S175). Next, the main CPU 71 turns the insurance-effective flag off (step S176). After the processing has been conducted, the insurance-check processing is completed.

<Free-Game Execution Processing>

Next, with reference to FIGS. 18 to 21, the free-game execution processing is described.

Figure 18A:
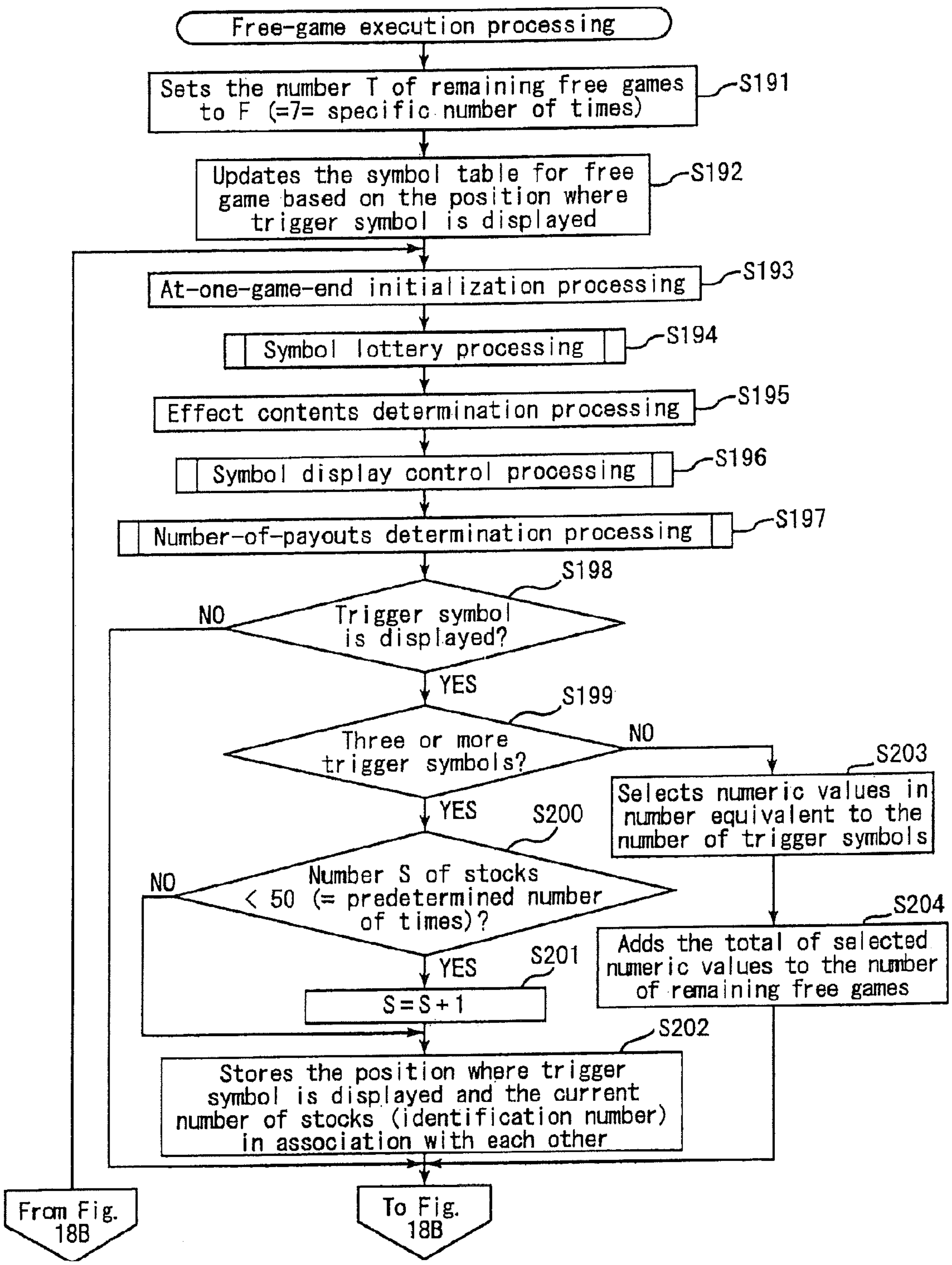
FIG. 18 is a view illustrating a flowchart of free-game execution processing for the gaming machine according to the embodiment of the present invention.
Figure 18B:
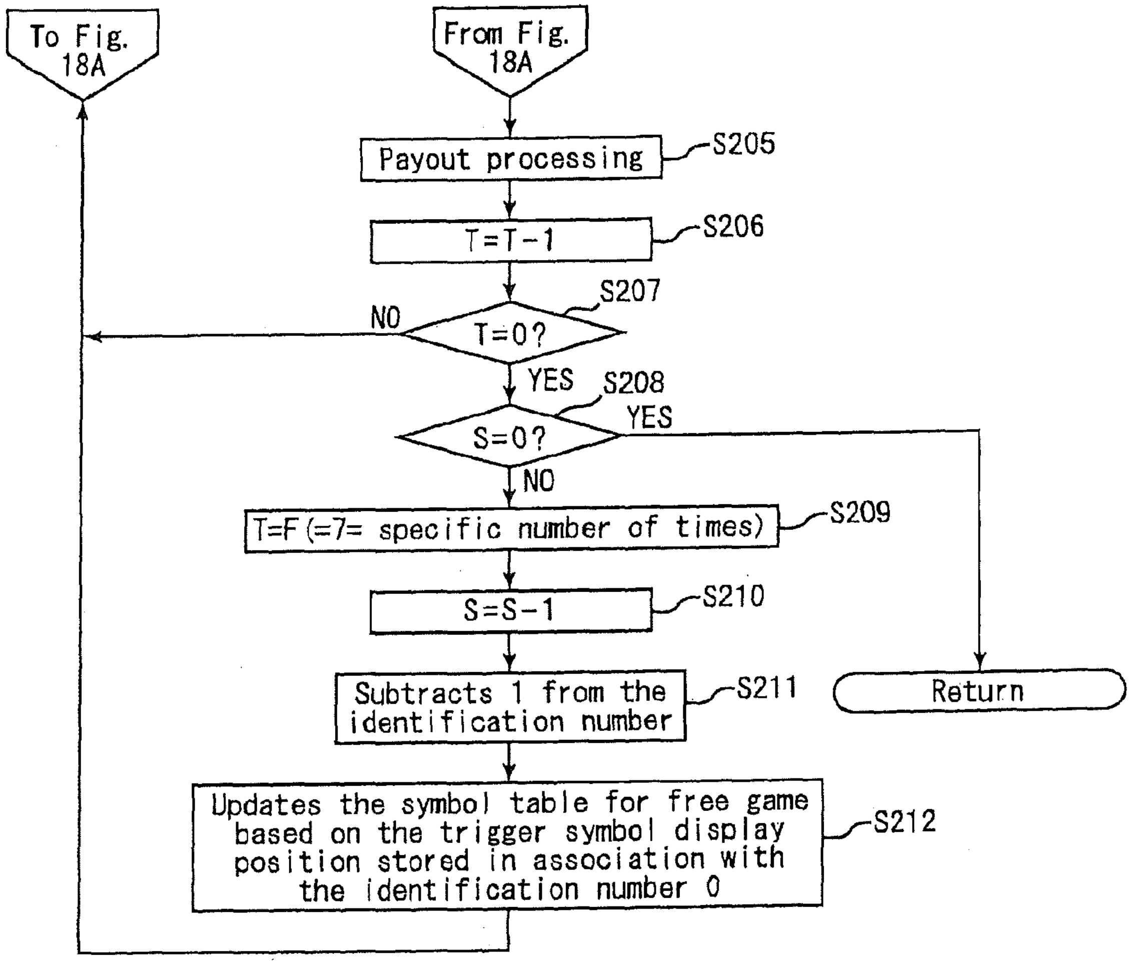

FIG. 18 is a view illustrating a flowchart of free-game execution processing for the gaming machine according to the embodiment of the present invention.

FIG. 19 is a view illustrating an exemplary image displayed to the lower image display panel provided in the gaming machine according to the embodiment of the present invention.

FIG. 20 is a view illustrating a symbol table for free game.

First, the main CPU 71 sets the number T of remaining free games as T=F (=7=the specific number) in the number-of-free-games storage area of the RAM 73 (step S191). The main CPU 71 displays the free-game generation image 250 (see FIG. 1B) to the lower image display panel 141.

Next, the main CPU 71 executes updating processing of the symbol table for free game (step S192). In the processing, the main CPU 71 updates the symbol table for free game based on the position where the trigger symbol 100 has been rearranged.

Specifically, the main CPU 71 newly sets "SABER TIGER" ("WILD") to the code numbers corresponding to the symbols displayed on the lower side than the position where the trigger symbol 100 has been rearranged.

More specifically, when the code number that has been determined in step S112 in FIG. 14 is "03", "SABER TIGER" ("WILD") is set to the code numbers "04", "05" and "06".

Further, when the code number that has been determined in step S112 in FIG. 14 is "02", "SABER TIGER" ("WILD") is set to the code numbers "04" and "05".

Furthermore, when the code number that has been determined in step S112 in FIG. 14 is "01", "SABER TIGER" ("WILD") is set to the code number "04".

Figure 19A:
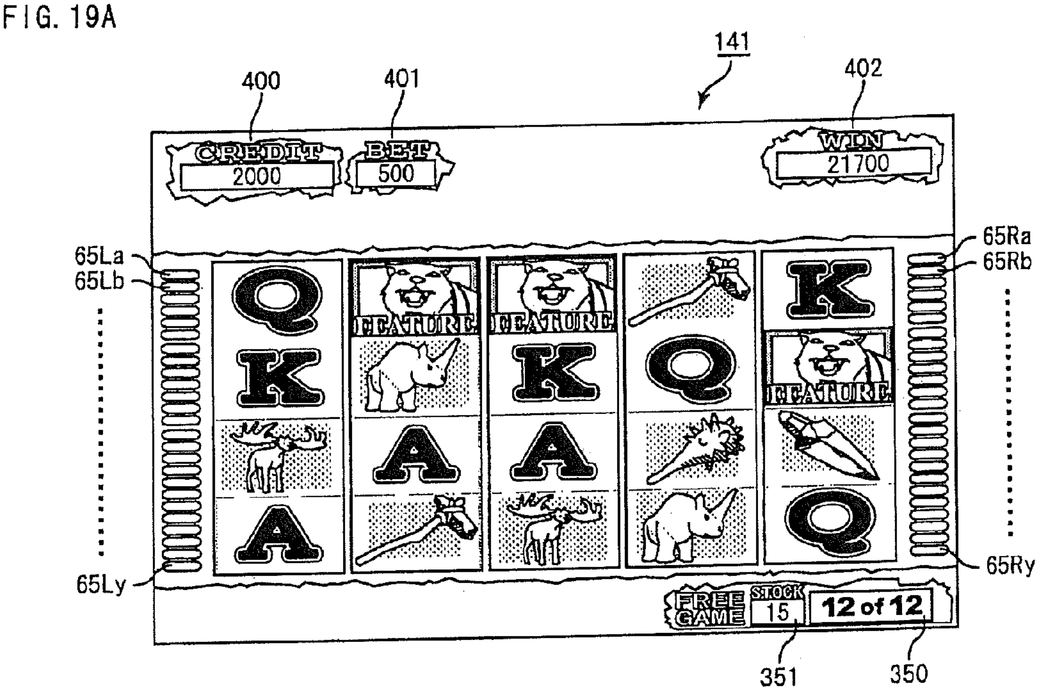
FIG. 19A is a view illustrating an exemplary image displayed to the lower image display panel provided in the gaming machine according to the embodiment of the present invention.
Figure 19B:
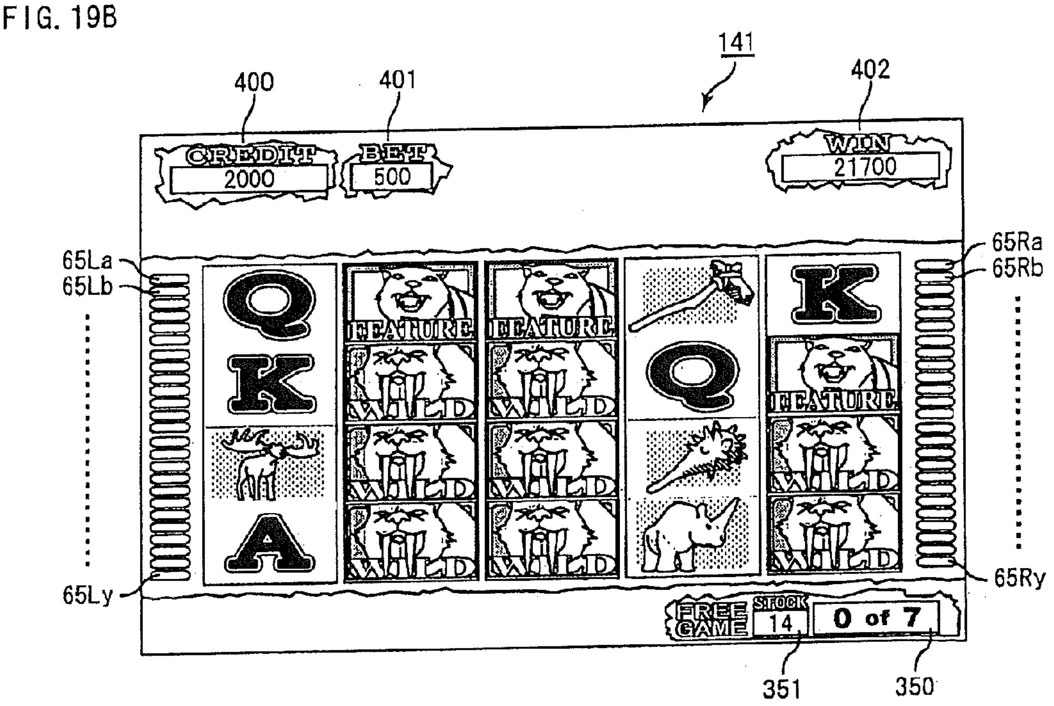
FIG. 19B is a view illustrating an exemplary image displayed to the lower image display panel provided in the gaming machine according to the embodiment of the present invention.

For example, a symbol table for free game as shown in FIG. 20 is generated when the trigger symbols 100 each has been rearranged to the upper region of the second video reel, the upper region of the third video reel, and the central upper region of the fifth video reel, as shown in FIG. 19A. As a result, symbols of "SABER TIGER" ("WILD") are displayed as shown in FIG. 19B.

As described above, the symbol of "SABER TIGER" ("WILD") is a symbol (wild symbol) that can be replaced by another symbol. Thus, the number of payouts in the free game can be larger than that in the normal game. It is therefore possible to further increase a sense of expectation of the player for generation of the free game.

Also, since the number of wild symbols to be added is related to the position where the trigger symbol 100 is rearranged, it is possible to make the player have interest and concern in such positions.

After executing the processing of step S192, the main CPU 71 executes the processing of step S193 to step S197; however, since the processing is substantially the same as the processing of step S12, step S14, step S16 to step S18 in FIG. 10, only different points thereof are described.

In step S14 in FIG. 10, descriptions have been given in which the to-be stopped symbols are determined based on the symbol table for normal game.

In contrast, in step S194 in FIG. 18A, the to-be stopped symbols are determined based on the symbol table for free game.

In step S197, the number of payouts is determined on the assumption that coins are betted in number corresponding to the number of coins betted in the normal game that has triggered the free game.

After executing the processing of step S197, the main CPU 71 determines whether or not the trigger symbol 100 (see FIG. 1A) has been rearranged (step S198).

When the main CPU 71 determines that the trigger symbol 100 has been rearranged, the main CPU 71 then determines whether or not the number of the rearranged trigger symbols 100 is three or more (step S199).

When the main CPU 71 determines that the number of the rearranged trigger symbols 100 is less than three, the main CPU 71 selects the numbers of additional free games in number equivalent to the number of the rearranged trigger symbols 100 (step S203).

FIG. 21 is a view illustrating a number-of-additional-free-games selection table.

In the number-of-additional-free-games selection table, each of the numeric values of "1", "2", "3", and "10", which can be adopted as the number of additional free games, is associated with a random number range.

In the processing of step S203, the main CPU 71 extracts random numbers in number equivalent to the number of rearranged trigger symbols 100. The main CPU 71 then selects the numbers of additional free games associated with the respective extracted random numbers.

Next, the main CPU 71 adds the sum of the numbers of additional free games selected in step S203 to the number T of remaining times shown by the number-of-remaining-times data stored in the number-of-free-games storage area of the RAM 73.

When determining in step S199 that the number of the rearranged trigger symbols 100 is three or more, the main CPU 71 determines whether or not the number S of stocks shown by the number-of-stocks data stored in the number-of-stocks storage area of the RAM 73 is smaller than the predetermined number of times (50) (step S200).

When the main CPU 71 determines that the number S of stocks is smaller than the predetermined number of times (50), the main CPU 71 sets the number S of stocks as S=S+1, in the number-of-stocks storage area of the RAM 73 (step S201).

When determining in step S200 that the number S of stocks is equal to the predetermined number of times (50) or after executing the processing of step S201, the main CPU 71 stores this number S of stocks as an identification number, in association with the position where the trigger symbol has been rearranged (step S202). In the processing, the main CPU 71 stores into the RAM 73 this identification number and the code number determined in step S194 associated with each other.

When determining in step S198 that the trigger symbol 100 has not been rearranged or after executing the processing of step S202 or step S204, the main CPU 71 conducts the payout processing (step S205). Since the payout processing has been described in step S24 in FIG. 10, the descriptions thereof are omitted here.

The main CPU 71 then sets the number T of remaining free games as T=T−1, in the number-of-free-games storage area of the RAM 73 (step S206).

Next, the main CPU 71 determines whether or not T is 0, based on the number of remaining times stored in the number-of-free-games storage area of the RAM 73 (step S207).

When the main CPU 71 determines that T is not 0, the main CPU 71 returns the processing to step S193.

In the present embodiment, a case is described in which the number T of remaining free games is decreased every time a free game is conducted, and the processing of step S208 and subsequent steps is conducted when T has become 0. However, in the present invention, it may be configured so that the processing of step S208 and subsequent steps is conducted when the number of executed free games, which is counted every time a free game is executed, has reached the number of total free games.

When determining in step S207 that T is 0, the main CPU determines whether or not S is 0, based on the number-of-stocks data stored in the number-of-stocks storage area of the RAM 73 (step S208).

When the main CPU 71 determines that S is not 0, the main CPU 71 completes the present subroutine.

On the other hand, when the main CPU 71 determines that S is not 0, the main CPU 71 sets the number T of remaining free games as T=F (=7=the specific number of times), in the number-of-free-games storage area of the RAM 73 (step S209).

The main CPU 71 then sets the number S of stocks as S=S−1, in the number-of-stocks storage area of the RAM 73 (step S210).

Next, the main CPU 71 subtracts 1 from the identification number that is stored in association with the code number determined in step S194 (step S211).

The main CPU 71 updates the symbol table for free game, based on the code number stored in association with the identification number "0" (step S212). Since updating of the symbol table for free game has been described in step S192, and the descriptions thereof are omitted here.

As a result of the processing of step S212, "SABER TIGER" ("WILD") is set in the symbol table for free game, based on the position where the trigger symbol has been rearranged in the free game that has triggered the addition to the number of stocks. Accordingly, it is possible to impress the player with such a free game that has triggered the addition to the number of stocks.

After executing the processing of step S212, the main CPU 71 shifts the processing to step S193.

With reference to FIGS. 18 to 21, the free-game execution processing (see step S20 in FIG. 10) has been described above.

<Insurance Selection Processing>

Figure 22:
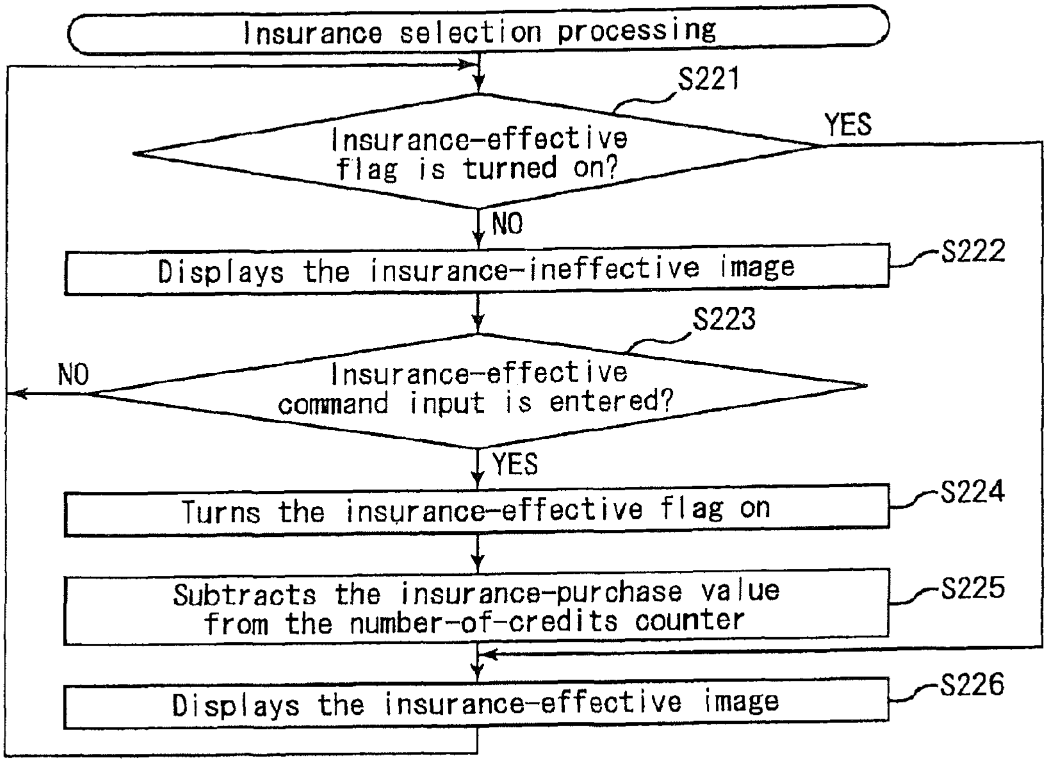
FIG. 22 is a view illustrating a flowchart of insurance selection processing for the gaming machine according to the embodiment of the present invention.

Next, with reference to FIG. 22, the insurance selection processing is described.

FIG. 22 is a view illustrating a flowchart of the insurance selection processing for the gaming machine according to the embodiment of the present invention.

First, the main CPU 71 determines whether or not the insurance-effective flag is turned on (step S221). When the main CPU 71 determines that the insurance-effective flag is not turned on, the main CPU 71 displays an insurance-ineffective image (step S222). The main CPU 71 transmits a command to display the insurance-ineffective image to the graphic board 130. Based on the command, the graphic board 130 generates the insurance-ineffective image and displays the image to the lower image display panel 141.

As the insurance-ineffective image, for example, an image showing "INSURANCE BET $1.00 TOUCH TO BET" is displayed. This image is an image for prompting the player to select whether or not to make the insurance effective, and notifying the player of the amount required for making the insurance effective. The player can input a command to make the insurance effective by touching a predetermined place on the touch panel 114.

Subsequently, the main CPU 71 determines whether or not an insurance-effective command input has been entered (step S223). When the main CPU 71 determines that the insurance-effective command input has not been entered, the main CPU 71 shifts the processing to step S221 with the insurance-effective flag turned off. On the other hand, when the main CPU 71 determines that the insurance-effective command input has been entered, the main CPU 71 turns the insurance-effective flag on (step S224).

Next, the main CPU 71 subtracts the insurance-purchase amount from the number-of-credits counter (step S225). In the present embodiment, an amount corresponding to, for example, one dollar is subtracted from the number-of-credits counter. After step S225 or when determining in step S221 that the insurance-effective flag is turned on, the main CPU 71 displays the insurance-effective image (step S226).

As the insurance-effective image, for example, an image showing "INSURANCE CONTINUED WIN 200 CREDIT" is displayed. This image is an image informing the player that the insurance is effective, and that the value of "200" is to be added to the number-of-credits counter when the insurance condition is satisfied. After the processing has been conducted, the processing is shifted to step S221.

As above, the present embodiment has been described.

According to the gaming machine 1 relating to the present embodiment, three trigger symbols 100 are required to be stop-displayed in order for the free game to be generated; however, once the free game has been generated, the number of free games is added even when the number of stop-displayed trigger symbols 100 is less than three. Thus, once the free game is generated, it is possible to give the player an impression that the free game can be played for long periods of time, and to increase a sense of expectation of the player in generation of the free game.

Also, according to the gaming machine 1 relating to the present embodiment, a larger numeric value being selected can lead to addition of a large number of free games. It is therefore possible to increase a sense of expectation of the player for addition of the number of free games. Particularly, it is possible to make the player have a sense of expectation for stop-display of two trigger symbols 100 and for selection of two large numbers of additional free games. Hence, it is possible to make the player absorbed in the game.

Further, according to the gaming machine 1 relating to the present embodiment, when the large number of additional free games has been selected, there is a possibility that a larger number of free games is added in the case where one or more and two or less trigger symbols 100 have been stop-displayed than in the case where three trigger symbols 100 have been stop-displayed.

Thus, since the game does not simply make the player have a sense of expectation for stop-display of a large number of trigger symbols 100, the game does not tend to be monotone and it is possible to provide the game that hardly bores the player.

Also, when a situation is actually generated where the number of free games, to be added due to the stop-display of one or more and two or less trigger symbols 100, is larger than the specific number of times (7), it is possible to make the player find the game surprising. Additionally, it is possible to please the player. As a result, it becomes possible to make the player absorbed in the game.

According to the gaming machine 1 relating to the present embodiment, free games are generated when three or more trigger symbols 100 have been stop-displayed in the normal game, while the number of free games is added when three or more trigger symbols 100 have been stop-displayed in the free game; it is therefore possible to maintain the sense of expectation of the player for stop-displaying of three trigger symbols 100, even in the free game.

Further, according to the gaming machine 1 relating to the present embodiment, the numeric image corresponding to the number of stocks is displayed. Displaying the numeric image can make the player recognize at a glance the number of stocks. Further, showing the increase of the numeric value corresponding to the numeric image can give the player an impression that the player is amassing money. As a result, it is possible to provide a sense of satisfaction to the player seeing the increase of the numeric value that corresponds to the numeric image.

According to the gaming machine 1 relating to the present embodiment, when three or more trigger symbols 100 have been stop-displayed, 1 is added to the number of stocks on condition that the number of stocks is equal to or less than the predetermined number of times (50). As just described, providing an upper limit to the number of stocks can prevent an infinite increase in the number of stocks. As a result, a profit decrease for the game facility can be prevented.

Further, although there is a possibility that an existence of a player continuously playing the free game for a too long period of time causes the other players to feel a sense of unfairness, the aforementioned gaming machine 1 relating to the present embodiment can prevent a rise of such a sense of unfairness.

Although the embodiments of the present invention were described above, they were just illustrations of specific examples, and hence do not particularly restrict the present invention. A specific configuration of each step and the like is appropriately changeable in terms of design. Further, the effects described in the embodiments of the present invention are just recitations of the most suitable effects generated from the present invention. The effects of the present invention are thus not limited to those described in the embodiments of the present invention.

Further, the foregoing detailed descriptions centered the characteristic parts of the present invention in order to facilitate understanding of the present invention. The present invention is not limited to the embodiments in the foregoing specific descriptions but applicable to other embodiments with a variety of application ranges. Further, terms and phrases in the present specification were used not for restricting interpretation of the present invention but for precisely describing the present invention. It is considered easy for the skilled in the art to conceive other configurations, systems, methods and the like included in the concept of the present invention from the concept of the invention described in the specification. Therefore, it should be considered that recitations of the claims include uniform configurations in a range not departing from the range of technical principles of the present invention. Moreover, an object of the abstract is to enable a patent office, a general public institution, an engineer belonging to the technical field who is unfamiliar with patent, technical jargon or legal jargon, and the like, to smoothly determine technical contents and an essence of the present application with simple investigation. Accordingly, the abstract is not intended to restrict the scope of the invention which should be evaluated by recitations of the claims. Furthermore, for thorough understanding of an object of the present invention and an effect specific to the present invention, it is desired to make interpretation in full consideration of documents already disclosed and the like.

The foregoing detailed descriptions include processing executed on a computer. Explanations and expressions above are described with the aim of being most efficiently understood by the skilled person in the art. In the specification, each step for use in deriving one result should be understood as the self-consistent processing. Further, in each step, transmission/reception, recording or the like of an electrical or magnetic signal is performed. While such a signal is expressed by using a bit, a value, a symbol, a letter, a term, a number or the like in processing of each step, it should be noted that those are used simply for the sake of convenience in description. While there are cases where processing in each step may be described using an expression in common with that of action of a human, processing described in the specification is essentially executed by a variety of devices. Further, other configurations requested for performing each step should become apparent from the above descriptions.

What is claimed is:

1. A gaming machine having at least a state of a first game and a state of a second game to which the state of the first game shifts and awards a predetermined benefit when at least a predetermined number of trigger symbols are rearranged as a result of variably displaying and rearranging a plurality of symbols in the state of the first game or in the state of the second game, the gaming machine comprising a controller programmed so as to execute a gaming process in which:

the first game state and the second game state are different from each other in the predetermined number of the rearranged trigger symbols required to award the predetermined benefit and the predetermined benefit is a free game as the second game which does not require a new bet; wherein the controller is programmed so as to also execute processes of:

in the first game, awarding a specific number of free games if the at least the predetermined number of trigger symbols required in the state of the first game are rearranged as a result of variably displaying and rearranging the plurality of symbols;

in the free game, awarding the specific number of free games if the at least the predetermined number of trigger symbols required in the free game as the second game are rearranged as a result of variably displaying and rearranging the plurality of symbols, wherein in the free game, the number of the trigger symbols required for awarding the specific number of free games is smaller than the number of the trigger symbols required for awarding the specific number of free games in the first game, and, wherein, in the free game, the number of free games awarded, when the at least the predetermined number of the trigger symbols are rearranged, is smaller than the number of free games awarded when the at least the predetermined number of the trigger symbols are rearranged in the first game.

2. A method of controlling a gaming machine, which is executed by a processor of the gaming machine, wherein, when executing a process which has at least a state of a first game and a state of a second game to which the state of the first game shifts, in which, when at least a predetermined number of trigger symbols are rearranged as a result of variably displaying and rearranging a plurality of symbols in the state of the first game or in the state of the second game, a predetermined benefit is awarded, the processor differentiates the state of the first game from the state of the second game in the number of the predetermined rearranged trigger symbols required for awarding the predeter-mined benefit, the predetermined benefit being a free game as the second game which does not require a new bet; and wherein the processor is programmed so as to also execute processes of:

in the first game, awarding a specific number of free games if the at least the predetermined number of trigger symbols required in the state of the first game are rearranged as a result of variably displaying and rearranging the plurality of symbols;

in the free game, awarding the specific number of free games if the at least the predetermined number of trigger symbols required in the free game as the second game are rearranged as a result of variably displaying and rearranging the plurality of symbols, wherein in the free game, the number of the trigger symbols required for awarding the specific number of free games is smaller than the number of the trigger symbols required for awarding the specific number of free games in the first game, and, wherein, in the free game, the number of free games awarded, when the at least the predetermined number of the trigger symbols are rearranged, is smaller than the number of free games awarded when the at least the predetermined number of the trigger symbols are rearranged in the first game.

* * * * *